United States Patent
Okajima

(10) Patent No.: US 6,736,462 B1
(45) Date of Patent: May 18, 2004

(54) BICYCLE RIM

(75) Inventor: Shinpei Okajima, Izumi (JP)

(73) Assignee: Shimano, Inc., Osaka (JP)

(*) Notice: Subject to any disclaimer, the term of this patent is extended or adjusted under 35 U.S.C. 154(b) by 0 days.

(21) Appl. No.: 10/319,693

(22) Filed: Dec. 16, 2002

(51) Int. Cl.$^7$ .................................................. B60B 1/14
(52) U.S. Cl. .................. 301/58; 301/95.106; 29/894.33
(58) Field of Search ....................... 301/58, 61, 95.104, 301/95.106, 95.107; 29/894.33, 894.333

(56) References Cited

U.S. PATENT DOCUMENTS

| | | | |
|---|---|---|---|
| 1,280,646 A | * 10/1918 | Billhartz ...................... | 301/58 |
| 4,583,787 A | * 4/1986 | Michelotti ................... | 301/58 |
| 5,651,591 A | * 7/1997 | Mercat et al. ......... | 301/95.108 |
| 5,806,935 A | 9/1998 | Shermeister | |
| 6,145,937 A | * 11/2000 | Chen ............................ | 301/58 |
| 6,216,344 B1 | 4/2001 | Mercat et al. | |
| 6,224,165 B1 | * 5/2001 | Mercat et al. ................ | 301/58 |
| 6,378,953 B2 | 4/2002 | Mercat et al. | |
| 6,588,474 B2 | * 7/2003 | Passarotto ................... | 152/427 |
| 2002/0014293 A1 | 2/2002 | Passarotto | |

FOREIGN PATENT DOCUMENTS

| | | |
|---|---|---|
| EP | 0130449 A2 | 1/1985 |
| EP | 0714791 A1 | 6/1996 |
| JP | 8-238903 A | 9/1996 |

* cited by examiner

*Primary Examiner*—Russell D. Stormer
(74) *Attorney, Agent, or Firm*—Shinjyu Global IP Counselors, LLP

(57) ABSTRACT

A hollow bicycle rim a plurality of tubular reinforcement members coupled to the inner and outer openings. Each of the reinforcement members has an internal abutment surface within an internal passageway designed to engage an enlarged head of a spoke to couple spokes to the rim. The inner and outer ends of the reinforcement members are secured to the inner and outer openings to prevent inner and outward movement of the reinforcement members, respectively. Each reinforcement member preferably has a preformed retaining surface and one or more deformed retaining surface to prevent inner and outer movement. Optionally, each reinforcement member can include a threaded connection instead of one or more the deformed retaining surfaces. Seal members are optionally mounted in the reinforcement members so that a tubeless tire can be used.

27 Claims, 20 Drawing Sheets

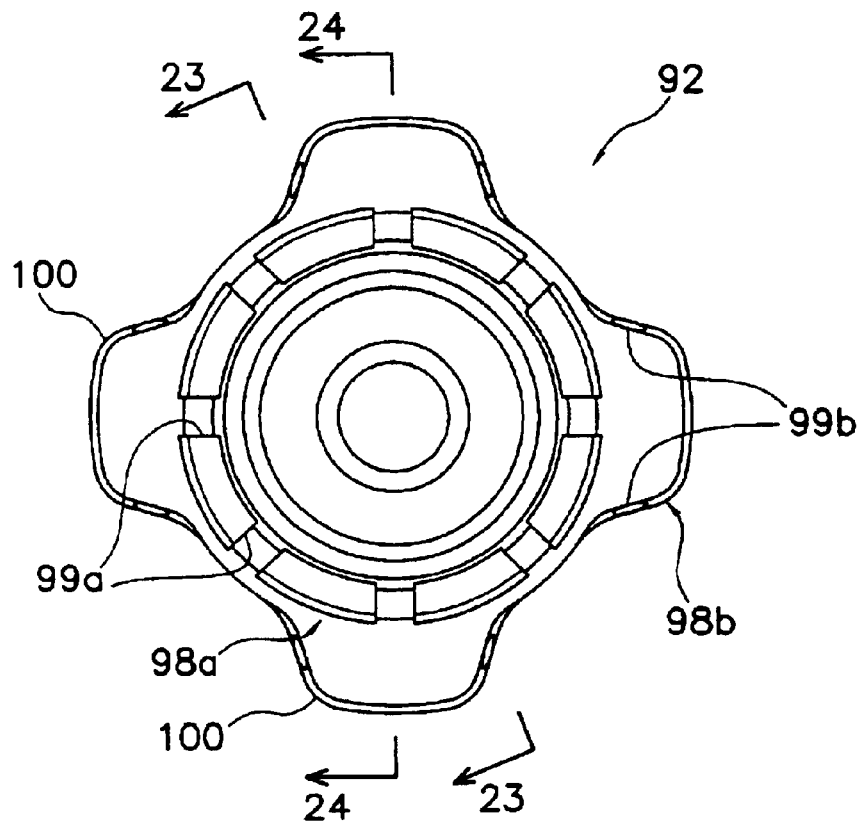
Fig. 22
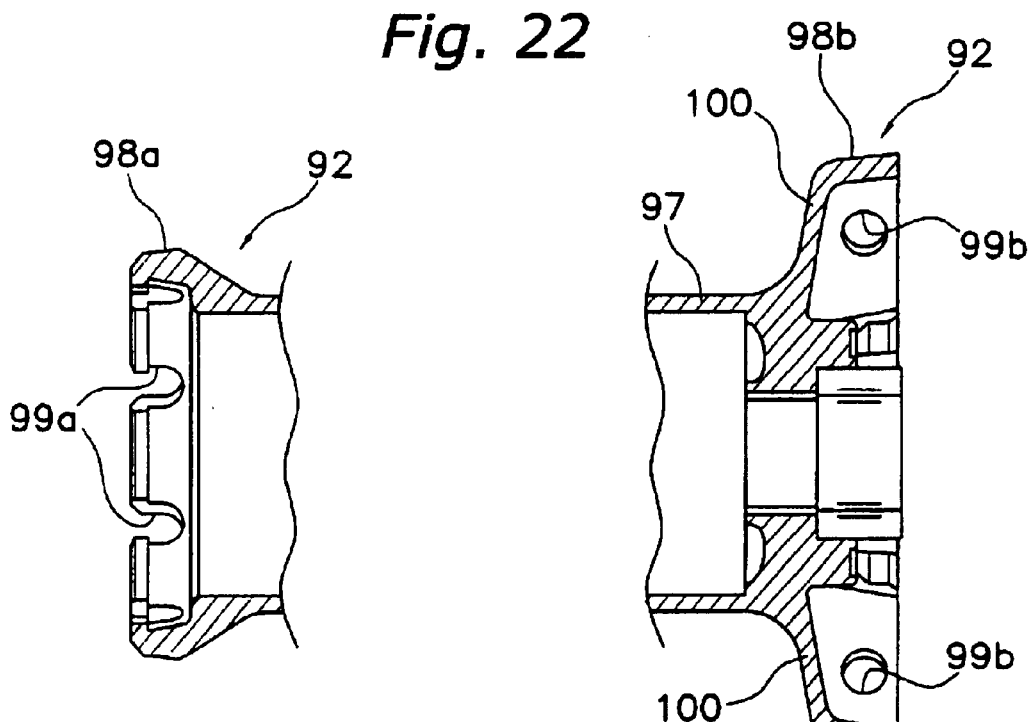
Fig. 23
Fig. 24

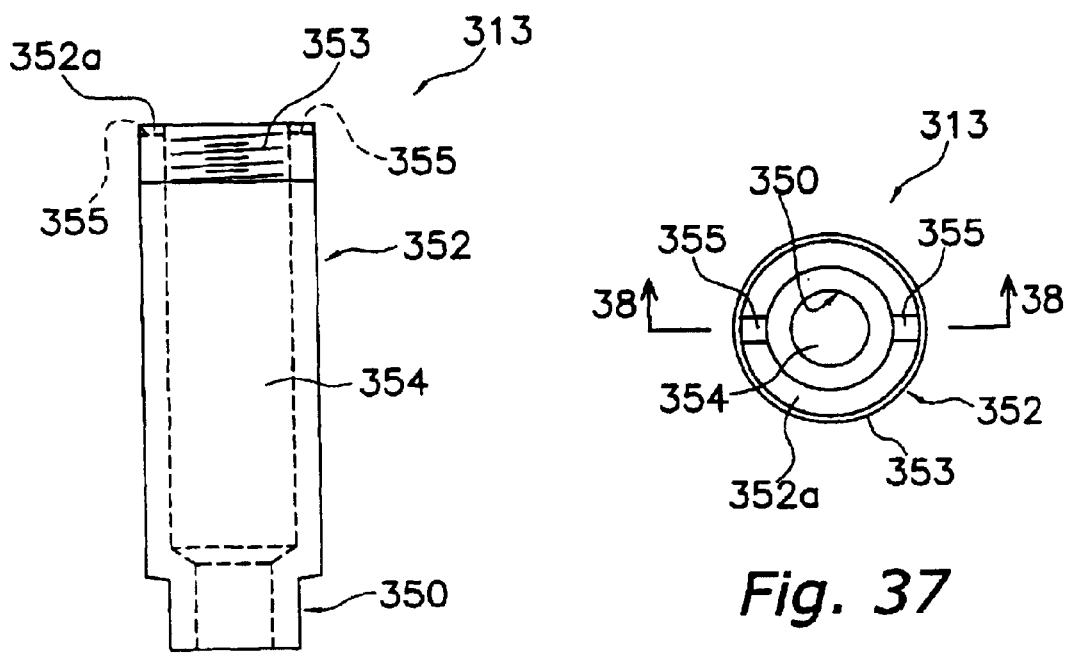
Fig. 36
Fig. 37
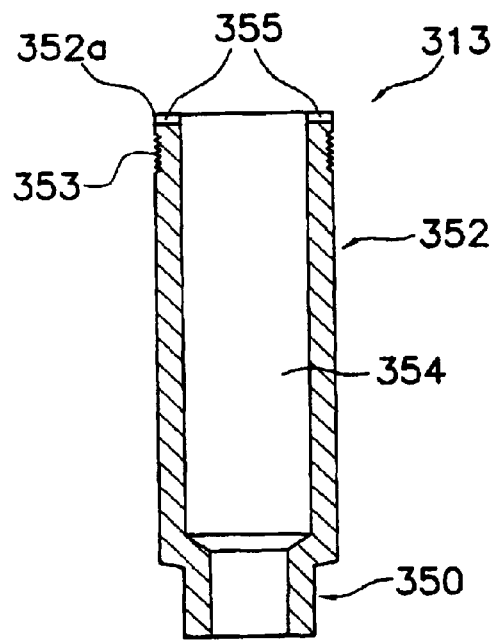
Fig. 38

BICYCLE RIM

BACKGROUND OF THE INVENTION

1. Field of the Invention

This invention generally relates to a bicycle wheel. More specifically, the present invention relates to a bicycle rim with a plurality of reinforcement members and a method of making such a rim.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle as well as the frame of the bicycle. One particular component of bicycles, which has been extensively redesigned over the past years, is the bicycle wheel. Bicycle wheels are constantly being redesigned to be strong, lightweight and more aerodynamic in design as well as to be simple to manufacture and assemble.

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to holes in the rim.

The above types of wheels have been designed for use with tube tires or tubeless tires. Typically, tubeless tire wheels have an annular seal arranged to seal the spoke attachment openings of the rim. In any case, these typical types of wheels can be expensive and complicated to manufacture and assemble. Moreover, these typical wheels are not always as strong and lightweight, as desired. Furthermore, with these typical wheels it can be difficult and/or complicated to replace a spoke or spokes.

In view of the above, there exists a need for a rim for a bicycle wheel, which overcomes the above mentioned problems in the prior art. This invention addresses this need in the prior art as well as other needs, which will become apparent to those skilled in the art from this disclosure.

SUMMARY OF THE INVENTION

One object of the present invention is to provide a rim for a bicycle wheel that is relatively strong yet relatively lightweight.

Another object of the present invention is to provide a rim that is relatively simple and inexpensive to manufacture and assemble.

Another object of the present invention is to provide a method for making a rim that is relatively strong yet relatively lightweight rim.

Still another object of the present invention is to provide a method of making a rim that is relatively simple and inexpensive to manufacture and assemble.

The foregoing objects can basically be attained by providing a bicycle rim comprising an outer annular portion, an inner annular portion and a plurality of tubular reinforcement members. The outer annular portion is adapted to have a tire mounted thereon and includes a plurality of circumferentially spaced outer attachment openings. The inner annular portion is fixedly coupled with the outer annular portion to form an annular hollow area. The inner annular portion includes a plurality of circumferentially spaced inner attachment openings spaced from the outer attachment openings. The plurality of reinforcement members are coupled to the inner and outer attachment openings. Each reinforcement member includes an inner end, an outer end and an interior passageway extending between the inner and outer ends. The inner ends are fixedly coupled to the inner attachment openings to form inner connections that prevent inward and outward movement of the inner ends relative to the inner annular portion of the rim. The outer ends are fixedly coupled to the outer attachment openings to form outer connections that prevent inward and outward movement of the outer ends relative to the outer annular portion of the rim. Each internal passageway has an inner tubular section and an outer tubular section located outwardly of the inner tubular section, the inner tubular section having a first maximum width and the outer tubular section having a second maximum width larger than the first maximum width to form an abutment surface.

The foregoing objects can also basically be attained by providing bicycle rim comprising providing an outer annular portion, an inner annular portion and a plurality of tubular reinforcement members. The outer annular portion is adapted to have a tire mounted thereon and includes a plurality of circumferentially spaced outer attachment openings. The inner annular portion is fixedly coupled with the outer annular portion to form an annular hollow area. The inner annular portion includes a plurality of circumferentially spaced inner attachment openings spaced from the outer attachment openings. The plurality of reinforcement members are coupled to the inner and outer attachment openings. Each reinforcement member includes an inner end and an outer end. The inner ends are fixedly coupled to the inner attachment openings to form inner connections Each inner connection has a first inner retaining surface contacting a first inner rim surface of the inner annular portion that substantially faces in a radially outward direction and a second inner retaining surface contacting a second inner rim surface of the inner annular portion that substantially faces in a radially inward direction. The outer ends are fixedly coupled to the outer attachment openings to form outer connections. Each outer connection has a first outer retaining surface contacting a first outer rim surface of the outer annular portion that substantially faces in a radially outward direction and a second outer retaining surface contacting a second outer rim surface of the outer annular portion that substantially faces in a radially inward direction.

The foregoing objects can also basically be attained by providing a method of making a bicycle rim. The method includes forming an annular rim with an annular hollow area, forming a plurality of outer attachment openings in an outer wall of the annular rim and forming a plurality of inner attachment openings in an inner wall of the annular rim that is substantially opposed to the outer wall of the annular rim. The method further includes forming a plurality of reinforcement members with inner ends, outer ends and internal passageways extending between the inner ends and the outer ends, each longitudinal passageway having an inner tubular section and an outer tubular section with a maximum width larger than a maximum width of the inner tubular section to form an abutment surface. The method further includes securing the inner ends of the reinforcement members to the inner spoke attachment openings to prevent inward and outward movement of the inner ends of the reinforcement members relative to the inner spoke attachment openings, and securing the outer ends of the reinforcement members to the outer spoke attachment openings to prevent inward and outward movement of the outer ends of the reinforcement members relative to the outer spoke attachment openings.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 22 is a left side elevational view of the hub body illustrated in FIG. 21;

FIG. 23 is a partial cross-sectional view of the hub body illustrated in FIGS. 21 and 22, as seen along section line 23—23 of FIG. 22;

FIG. 24 is a partial cross-sectional view of the hub body illustrated in FIGS. 21–23, as seen along section line 24—24 of FIG. 22;

FIG. 36 is an enlarged, side elevational view of the further modified reinforcement member illustrated in FIGS. 31–35, prior to deformation;

FIG. 37 is an outer end elevational view of the further modified reinforcement member illustrated in FIG. 36;

FIG. 38 is a cross-sectional view of the further modified reinforcement member illustrated in FIGS. 36 and 37, as seen along section line 38—38 of FIG. 37.

DETAILED DESCRIPTION OF THE PREFERRED EMBODIMENTS

Figure 1:
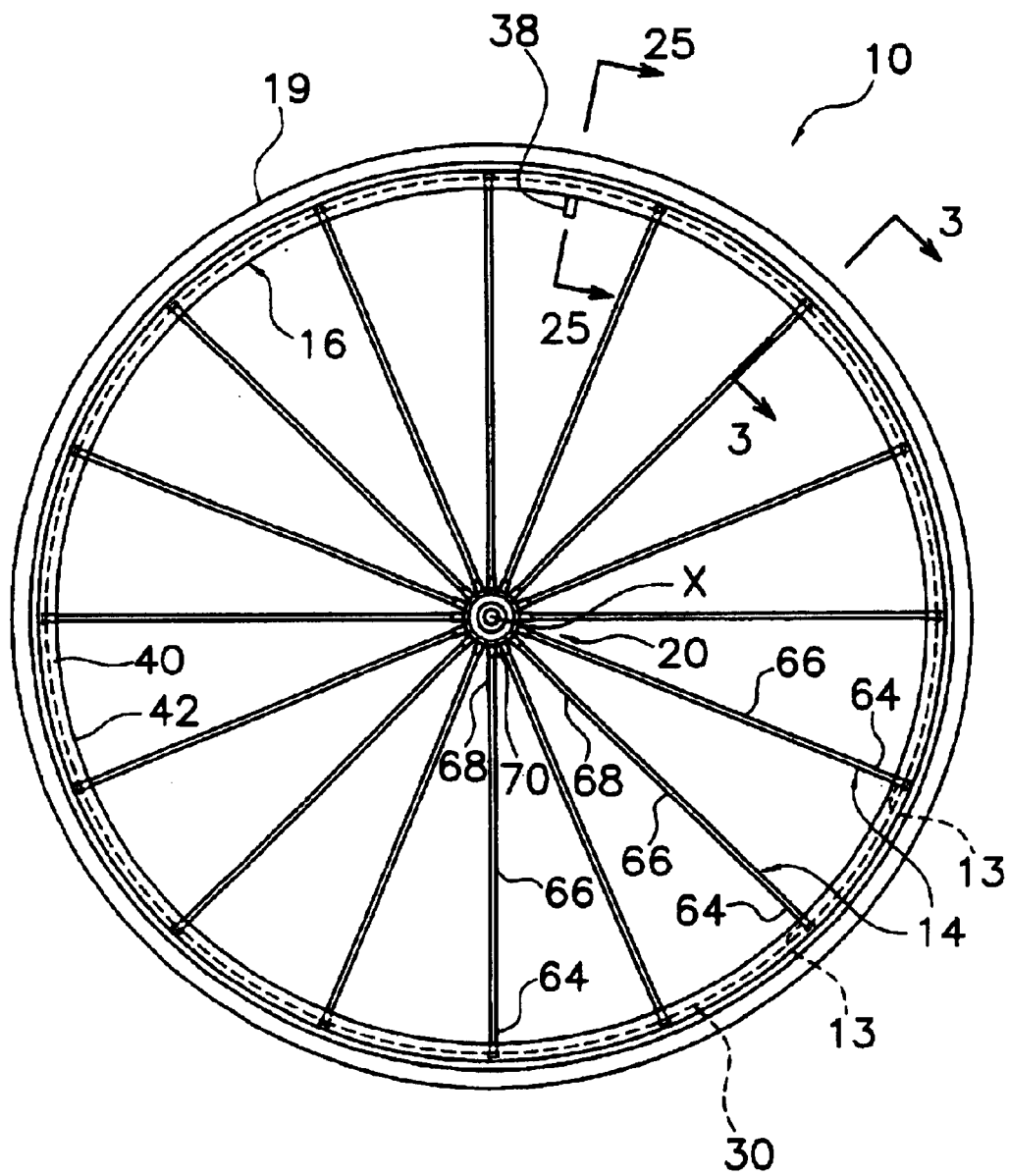
FIG. 1 is a side elevational view of a front bicycle wheel with a spoked rim assembly in accordance with a first preferred embodiment of the present invention.
Figure 2:
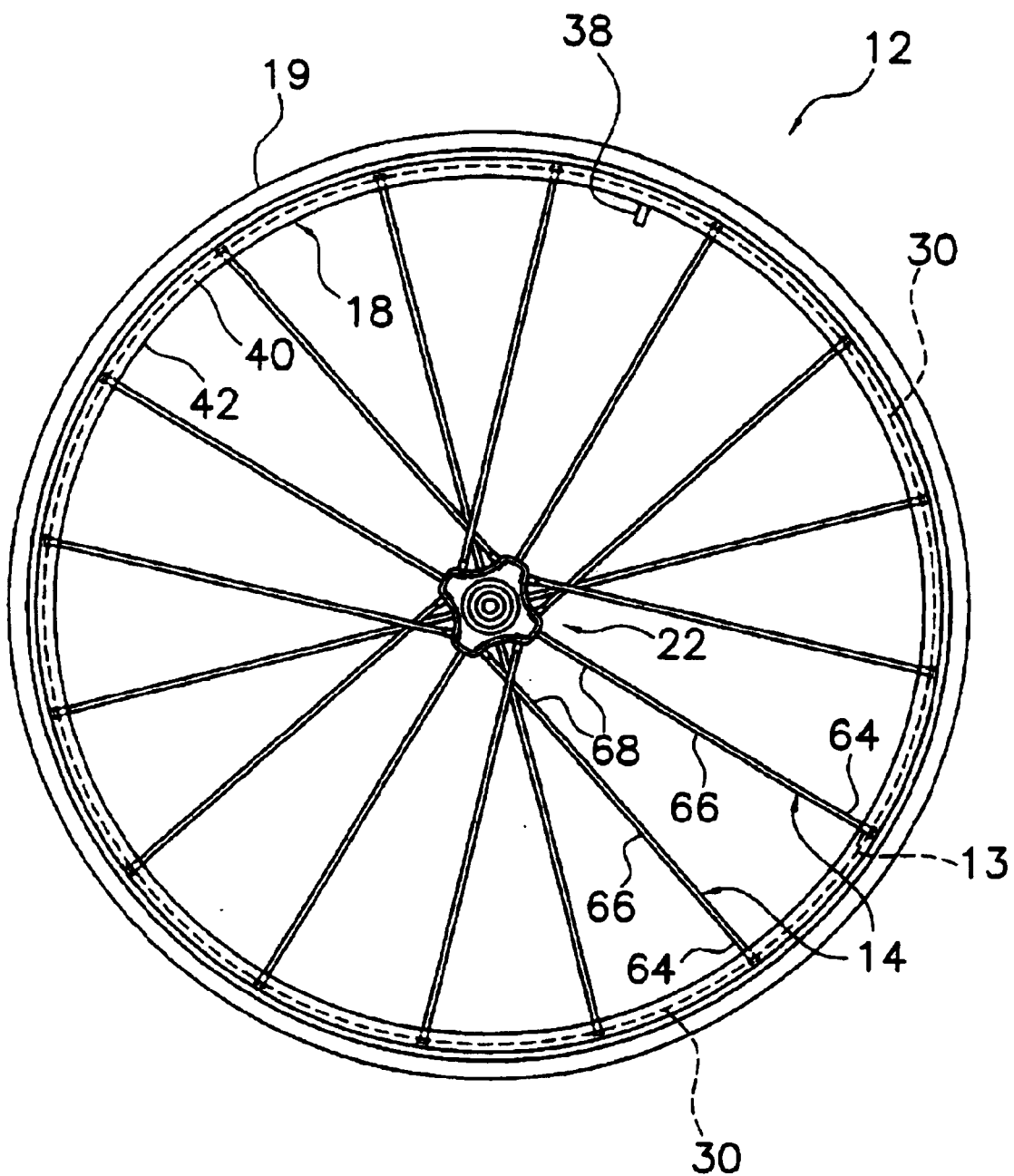
FIG. 2 is a side elevational view of a rear bicycle wheel with a spoked rim assembly in accordance with the first embodiment of the present invention.

Referring initially to FIGS. 1 and 2, front and rear bicycle wheels 10 and 12 are illustrated with front and rear rims 16 and 18 in accordance with the present invention. Specifically, each of the rims 16 and 18 includes a plurality of reinforcement members 13 coupled thereto, which are utilized to couple a plurality of outwardly extending tension spokes 14 to the annular rims 16 and 18 of the wheels 10 and 12, respectively. The reinforcement members 13 are preferably fixedly coupled to the rims 16 and 18 by deforming the reinforcement members, as discussed below in more detail. The rims 16 and 18 are each designed to have a pneumatic tire 19 coupled thereto in a conventional manner. Each tire 19 can include a tube (not shown) and a separate tire, or can be a tubeless type tire, as discussed below in more detail.

The spokes 14 of the bicycle wheel 10 connect the rim 16 to a front hub 20, while the spokes 14 of the bicycle wheel 12 connect the rim 18 to a rear hub 22. In the illustrated embodiment, the front bicycle wheel 10 utilizes sixteen radial spokes 14 coupled to the rim 16 at equally spaced circumferential locations as seen in FIG. 1. On the other hand, the rear bicycle wheel 12 utilizes a first set of eight radial spokes 14 and a second set of eight tangential spokes 14 coupled to the rim 18. The spokes 14 are coupled to the rim 18 at equally spaced circumferential locations as seen in FIG. 2. Thus, the rims 16 and 18 are preferably identical. Accordingly, only the rim 16 will be discussed and/or illustrated in detail herein. However, the descriptions and/or illustrations of the rim 16 also apply to the rim 18.

Of course, it will be apparent to those skilled in the art from this disclosure that bicycle wheels 10 and 12 could use modified rims and/or hubs in order to accommodate different spoking arrangements as needed and/or desired. Moreover, it will be apparent to those skilled in the art from this disclosure that the bicycle wheels 10 and/or 12 could use modified rims and/or hubs in order to accommodate fewer or more spokes 14 if needed and/or desired. In any case, the spokes 14 are preferably coupled to the annular rims 16 and 18 in circumferentially spaced arrangements.

As mentioned above, the rims 16 and 18 are preferably identical. Thus, only rim 16 will be discussed and/or illustrated in detail herein. The rim 16 is designed for rotation about a center axis X, and is constructed of a substantially rigid material, such as those materials, which are well known in the art. For example, the rim 16 can be constructed of any suitable metallic material, such as plated steel, stainless steel, aluminum, magnesium or titanium, as well as other non-metallic materials, such as a carbon fiber composite. A method of making the rim 16 will be discussed in more detail below.

Figure 3:
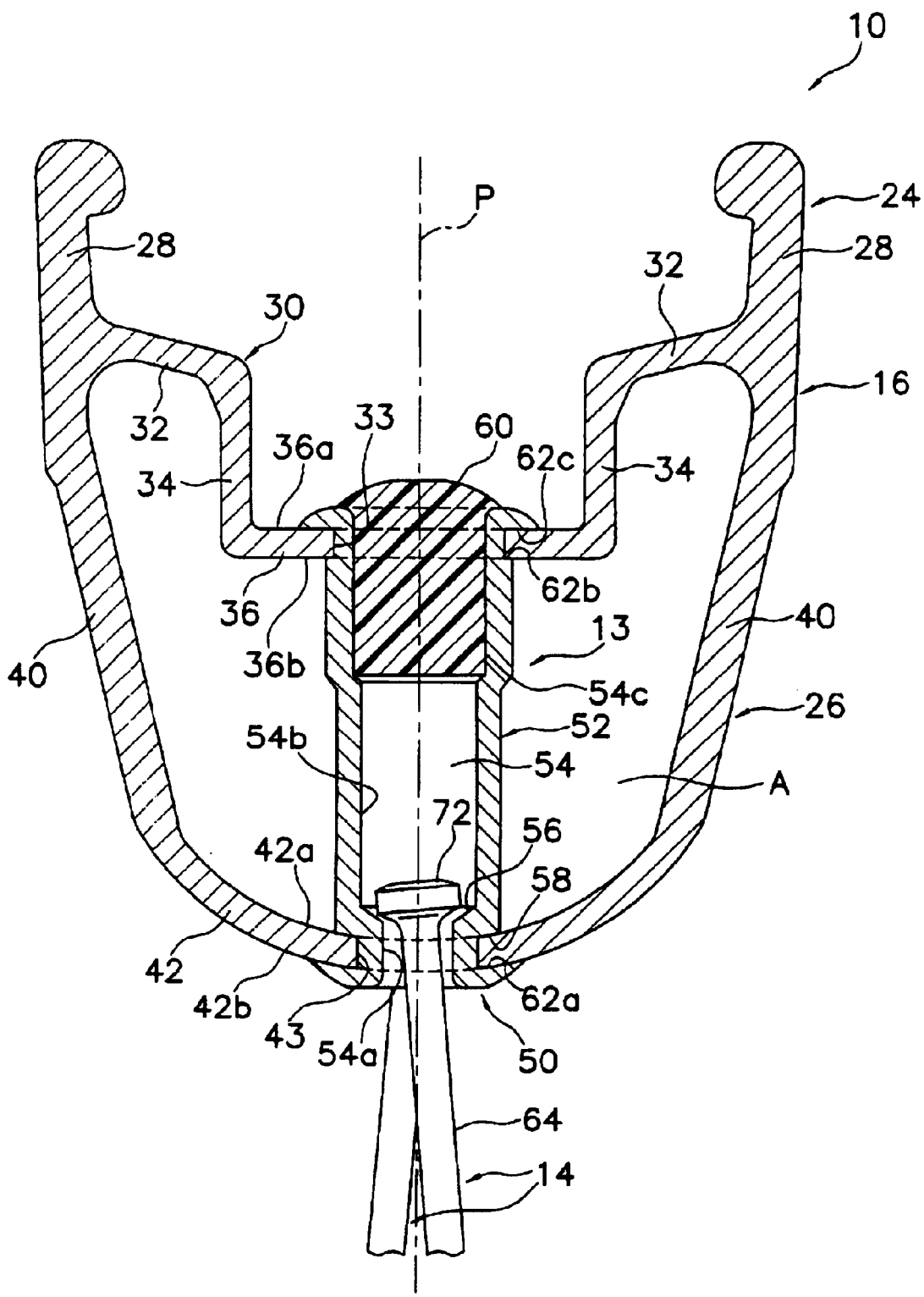
FIG. 3 is an enlarged, partial cross-sectional view of the front bicycle wheel illustrated in FIG. 1 with the tire removed for the purpose of illustration, as seen along section line 3—3 of FIG. 1.
Figure 25:
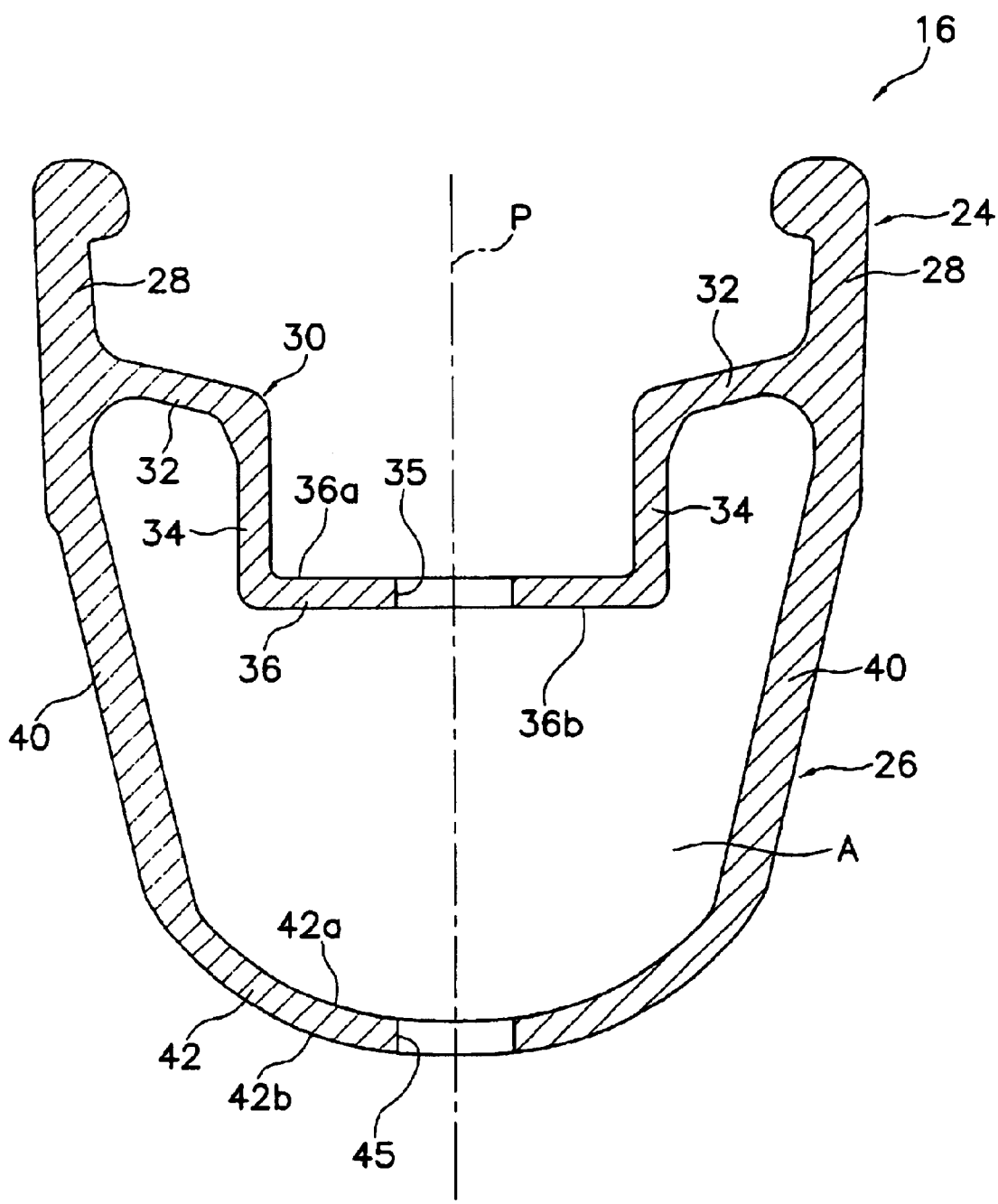
FIG. 25 is an enlarged, partial cross-sectional view of the rim of the front bicycle wheel illustrated in FIG. 1 with the tire removed for the purpose of illustration, as seen along section line 25—25 of FIG. 1.
Figure 26:
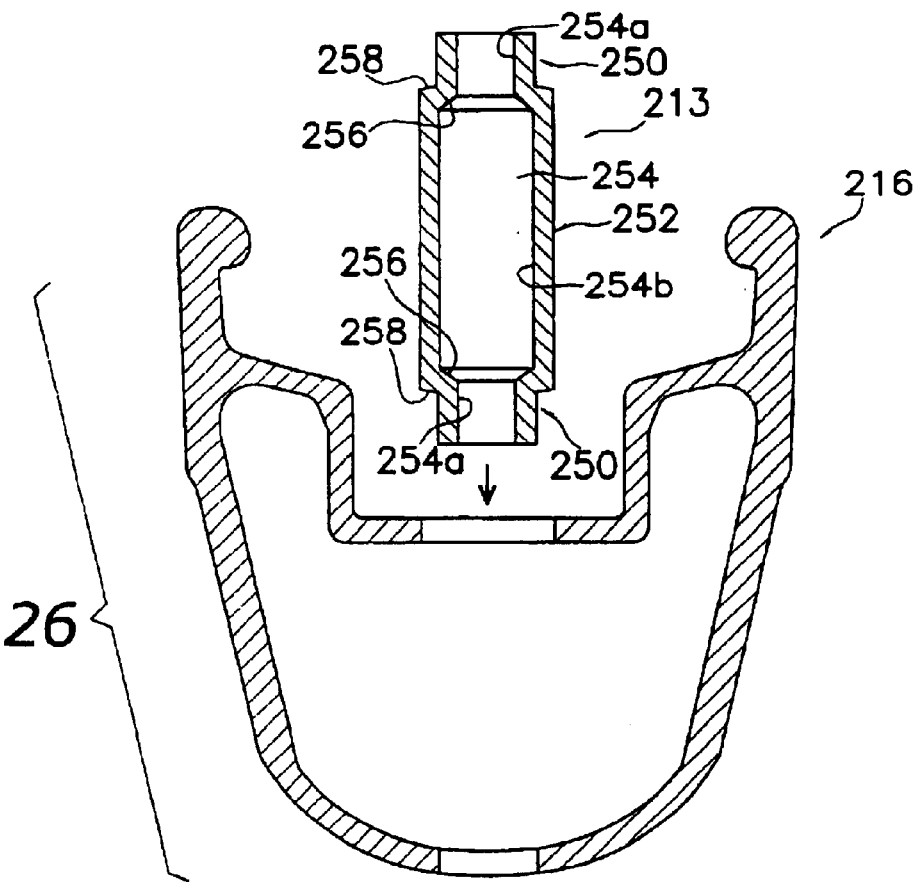
FIG. 26 is a partial, exploded cross-sectional view of the rim of the bicycle wheel illustrated in FIG. 1 prior to inserting a modified reinforcement member in a pair of spoke openings (i.e., one inner and one outer spoke opening) of the rim in accordance with a second embodiment of the present invention.
Figure 27:
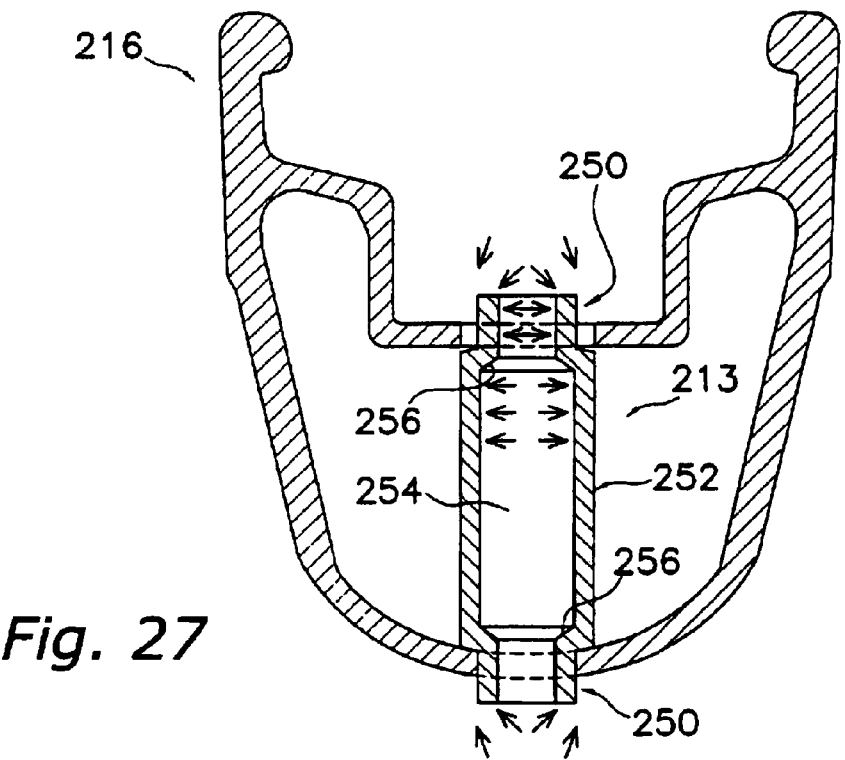
FIG. 27 is a partial cross-sectional view of the rim and the modified reinforcement member illustrated in FIG. 26, after inserting the modified reinforcement member the pair of spoke openings of the rim.
Figure 28:
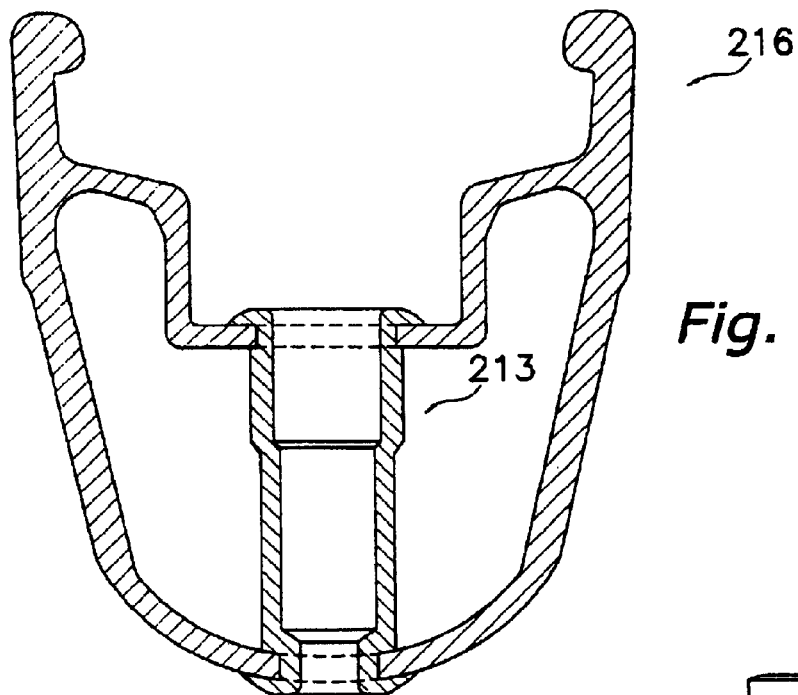
FIG. 28 is a partial cross-sectional view of the rim and the modified reinforcement member illustrated in FIGS. 26 and 27, after deforming the modified reinforcement member within the pair of spoke openings of the rim.
Figure 29:
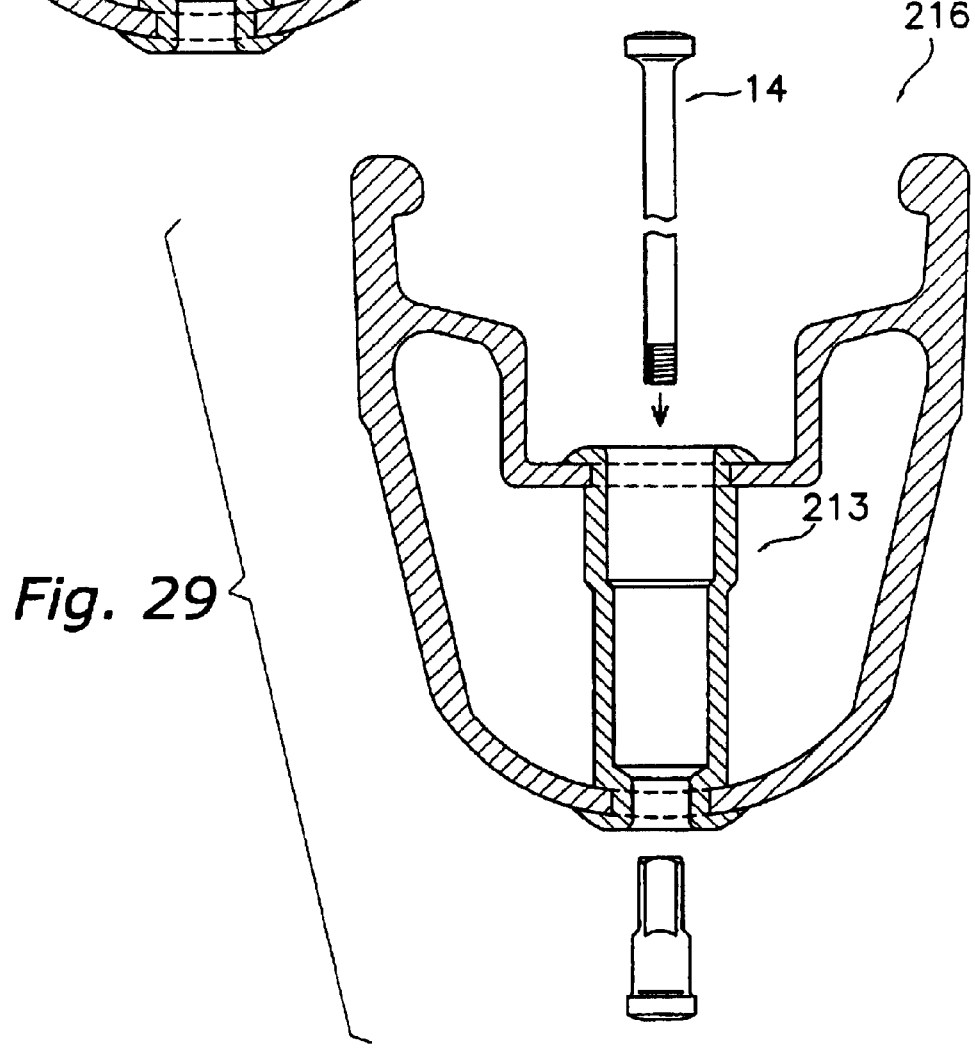
FIG. 29 is a partial, exploded cross-sectional view of the rim and the modified reinforcement member illustrated in FIGS. 26–28, prior to inserting a spoke into an interior passageway of the modified reinforcement member.
Figure 30:
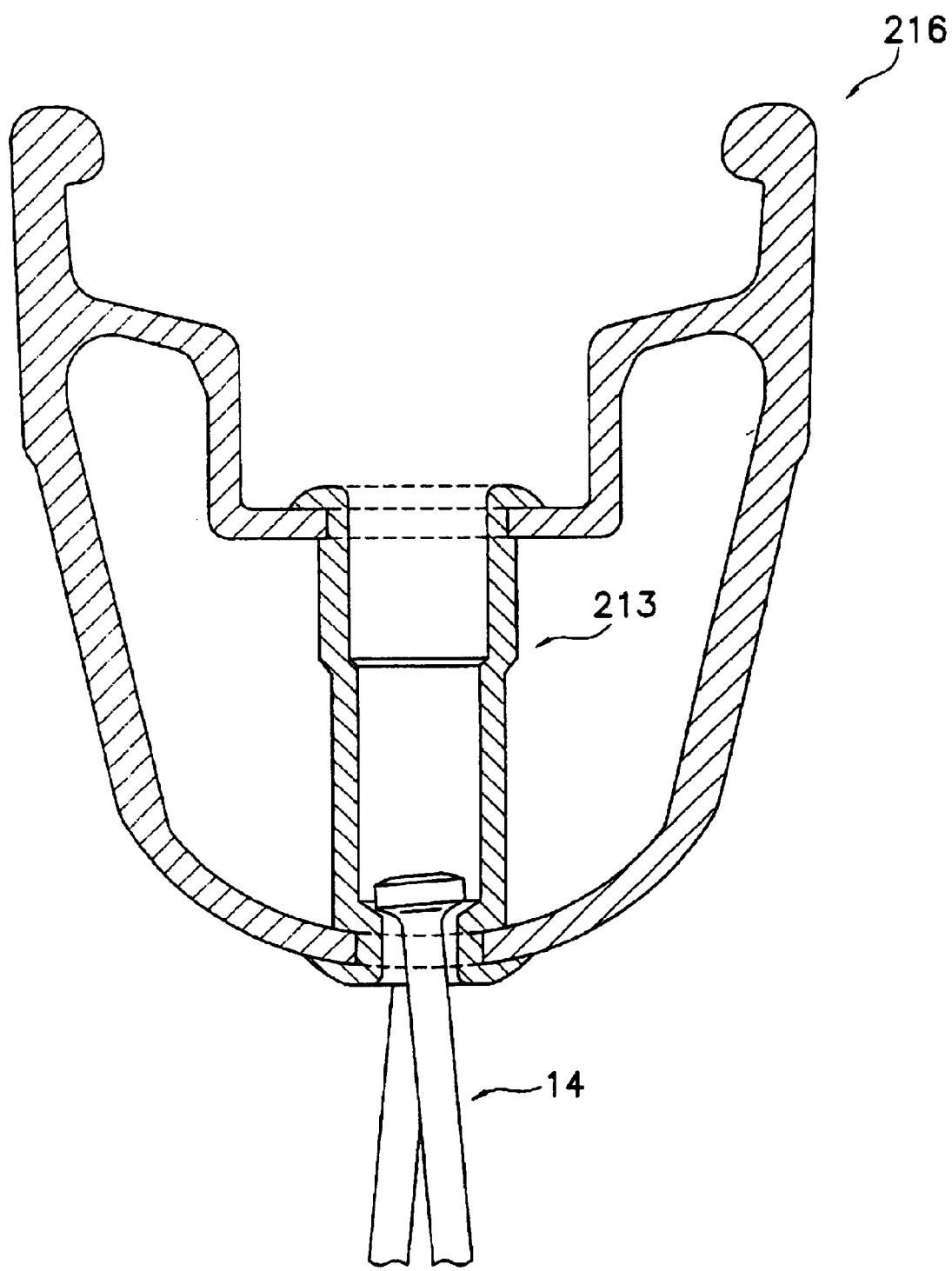
FIG. 30 is an enlarged, partial cross-sectional view of the rim and the modified reinforcement member illustrated in FIGS. 26–29, after inserting the spoke through the interior passageway of the modified reinforcement member.
Figure 31:
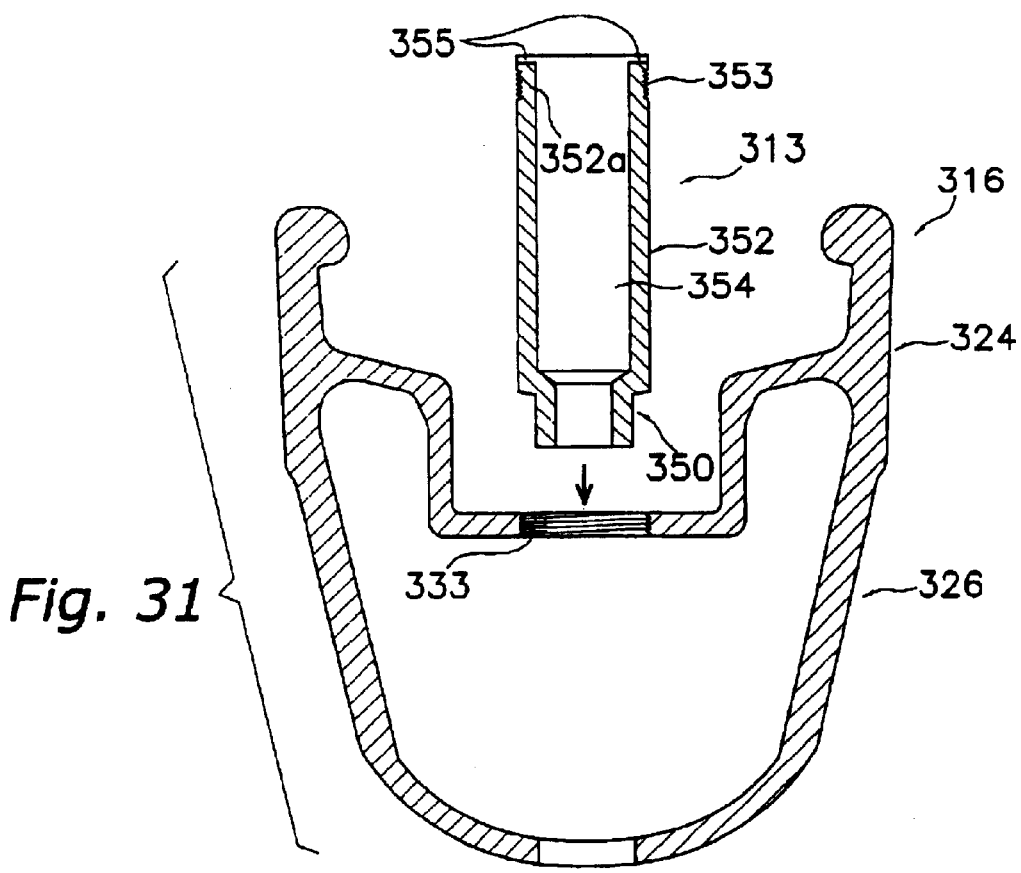
FIG. 31 is a partial, exploded cross-sectional view of a bicycle wheel prior to inserting a further modified reinforcement member in a pair of spoke openings (i.e., one inner and one outer spoke opening) of a modified rim in accordance with a third embodiment of the present invention.
Figure 32:
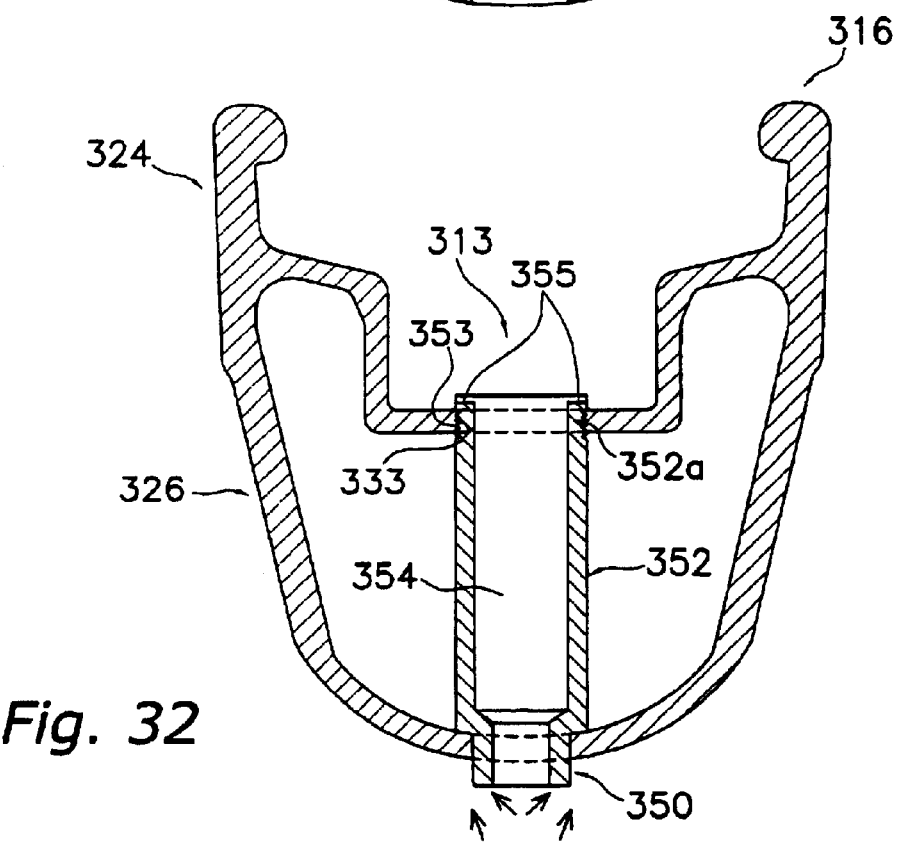
FIG. 32 is a partial cross-sectional view of the modified rim illustrated in FIG. 31, after inserting the further modified reinforcement member in the pair of spoke openings of the rim.
Figure 33:
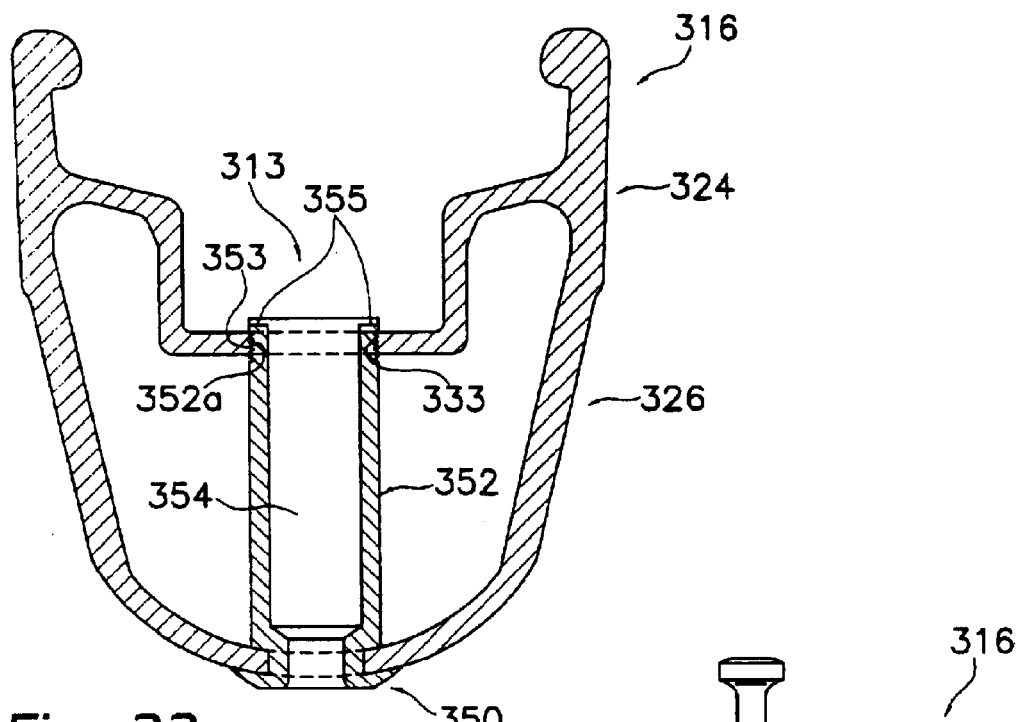
FIG. 33 is a partial cross-sectional view of the modified rim and the further modified reinforcement member illustrated in FIGS. 31 and 32, after deforming the further modified reinforcement member within the pair of spoke openings of the rim.
Figure 34:
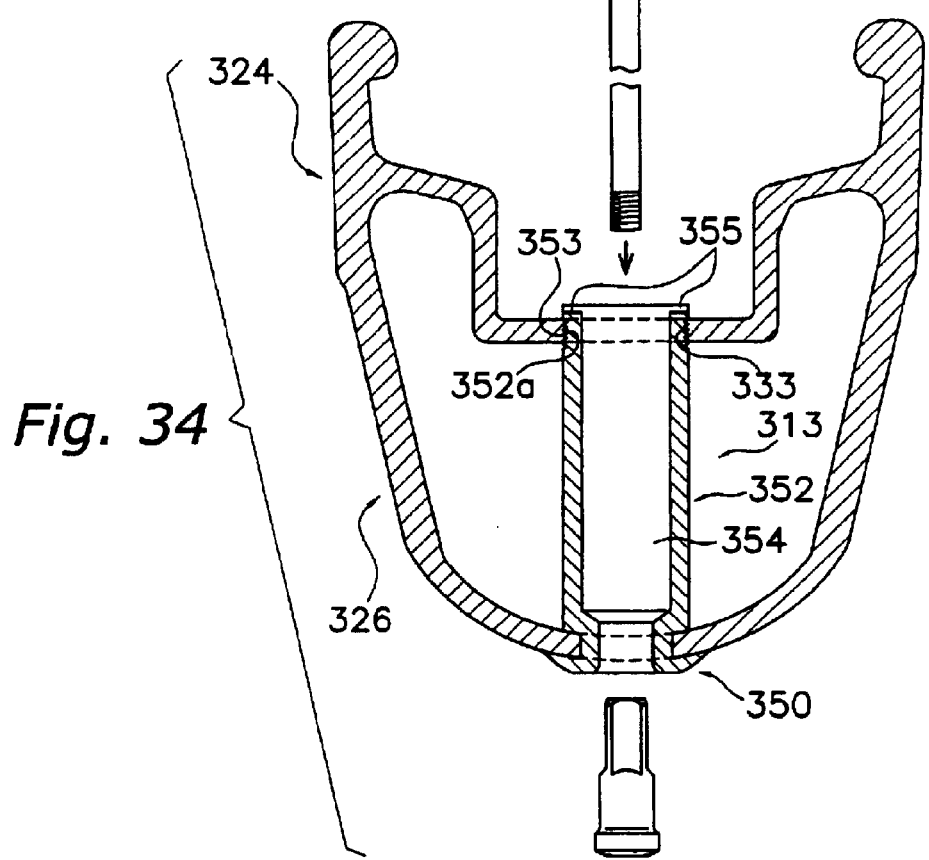
FIG. 34 is a partial cross-sectional view of the modified rim and the further modified reinforcement member illustrated in FIGS. 31–33, prior to inserting a spoke into an interiors passageway of the further modified reinforcement member.
Figure 35:
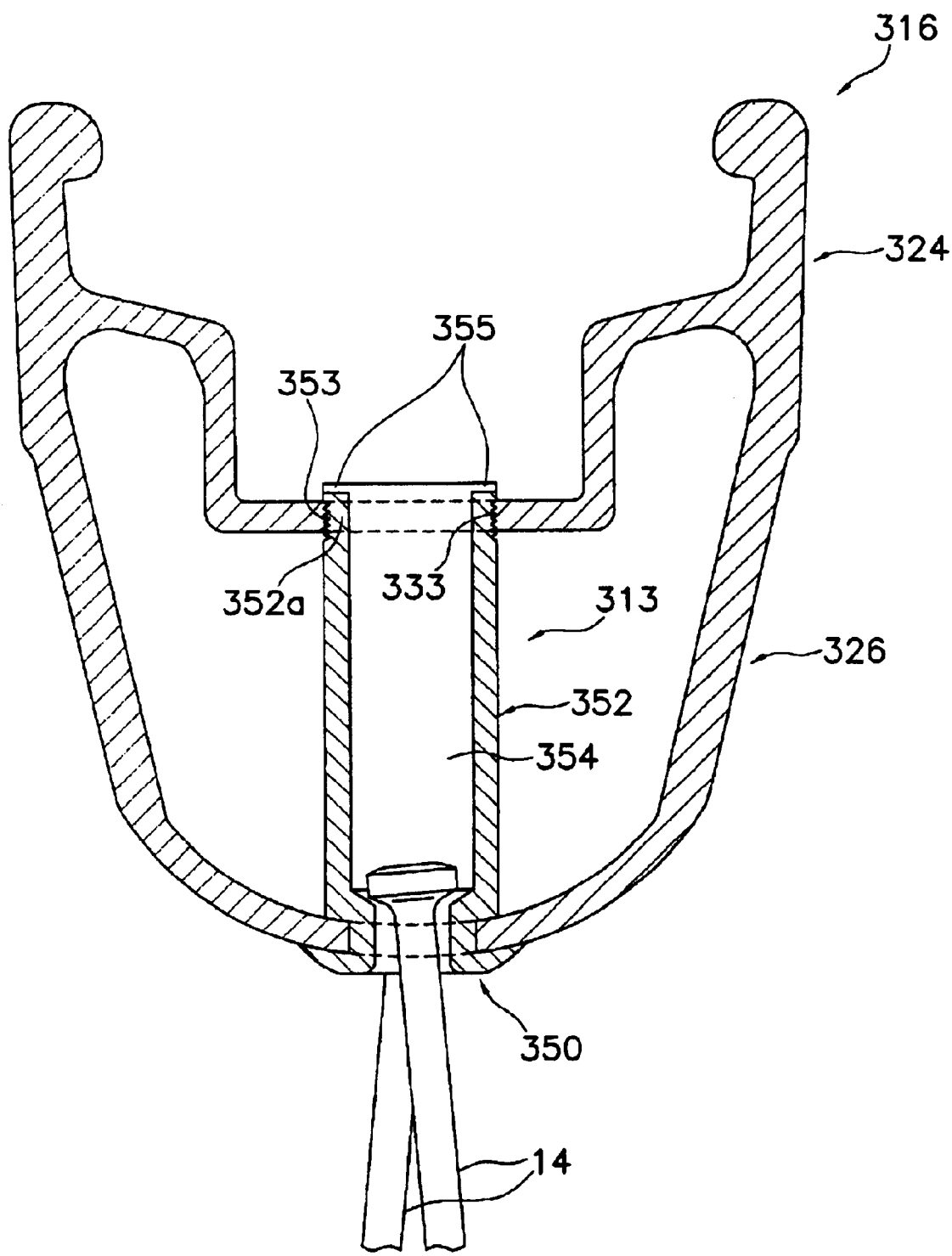
FIG. 35 is an enlarged, partial cross-sectional view of the bicycle wheel illustrated in FIGS. 31–34, after inserting the spoke through the interior passageway of the further modified reinforcement member.

Referring to FIGS. 1, 3 and 25, the rim 16 is substantially circular as seen in side elevation (FIG. 1), and basically includes an outer annular portion 24, an inner annular portion 26 and a plurality of the reinforcement members 13. The inner annular portion 24 is fixedly coupled with the outer annular portion 24 to form an annular hollow area A. In particular, the inner annular portion 26 preferably has a U-shaped cross-section with the ends of the U-shaped inner annular portion 26 coupled to opposite axial sides of the outer annular portion 24 to form the annular hollow area A. The outer annular portion 24 and the inner annular portion 26 are preferably integrally formed together as a one-piece unitary member to form a constant cross-sectional shape about the entire circumference of the rim 16. The reinforcement members 13 are preferably formed as separate members that are fixedly coupled to inner and outer annular portions 24 and 26 of the rim 16 by deforming the reinforcement members 13 using conventional metal working procedures. The rim 16 is preferably symmetrical relative to a center plane P that is perpendicular to the center axis X of the wheel 10.

Referring still to FIGS. 3 and 25, the outer annular portion 24 basically includes a pair of annular side sections 28 and an annular outer bridge or connecting section 30 with a plurality of outer attachment openings 33. The annular connecting section 30 extends between the annular side sections 28 to form a substantially U-shaped tire receiving recess as seen in cross-section (FIG. 3). More specifically, the annular connecting section 30 is fixedly coupled to the annular side sections 28 at a radial position between the inner and outer ends of the annular side sections 28.

The annular side sections 28 are annular plate shaped members that include annular tire supporting surfaces and annular braking surfaces in a conventional manner. The tire supporting surfaces are opposed annular surfaces with annular ribs that face each other toward the center plane P to retain beads of the tire 19 in a conventional manner. The annular braking surfaces face outwardly away from the center plane P to engage a conventional rim brakes. The annular side sections 28 are fixedly coupled to the inner annular portion 26, as explained below.

The annular connecting section 30 is a stepped tubular member that includes a pair of annular sloping legs 32, a pair of annular parallel legs 34 and an outer annular attachment element 36. The sloping legs 32 extend axially toward each other and slope radially inwardly toward the center axis X as the legs 32 extend toward the center plane P. The parallel legs 34 are parallel to the center plane P and the braking surfaces. The outer attachment element 36 is preferably cylindrically shaped. The parallel legs 34 extend between the sloping legs 32 and the outer attachment element 36 to form a substantially U-shaped annular attachment channel. In particular, outer ends of the parallel legs 34 are fixedly coupled to the sloping legs 32, while inner ends of the parallel legs 34 are fixedly coupled to the outer attachment element 36. The outer attachment element 36 preferably has the outer attachment openings 33 formed therein. The outer attachment element 36 also preferably includes a single valve aperture 35 formed therein for coupling a valve 38 therein, as seen in FIGS. 1 and 25.

The valve aperture 35 and the valve 38 can be designed for a tubeless tire in a conventional manner, and/or a tube-type tire in a conventional manner. In any case, because the valve 38 is conventional, the valve 38 will not be discussed and/or illustrated in detail herein.

The outer attachment element 36 preferably has sixteen (16) of the outer attachment openings 33 formed therein. The outer attachment openings 33 are equally spaced apart in the circumferential direction to be compatible with the front hub 20 such that sixteen (16) of the spokes 14 extend between the hub 20 and the rim 16. The outer attachment openings 33 extend between an annular outwardly facing surface 36a and an annular inwardly facing surface 36b of the cylindrical outer attachment element 36. Each outer attachment opening 33 preferably extends in the radial direction, and is dimensioned to receive one of the reinforcement members 13 therein. When the reinforcement members 13 are fixedly coupled in the outer attachment openings 33, the outwardly and inwardly facing surfaces 36a and 36b engage the reinforcement members 13, as discussed below. The outwardly and inwardly facing surfaces 36a and 36b can be considered first and second outer rim surfaces, respectively.

Referring still to FIG. 3, the inner annular portion 26 is a tubular member that is substantially U-shaped. The inner annular portion 26 basically includes a pair of slanted sections 40, an inner attachment element section 42 fixedly coupled to the slanted sections 40 and a plurality of inner attachment openings 43. The slanted sections 40 extend axially toward each other, and slope radially inwardly toward center axis X as the slanted sections 40 extend toward the center plane P. Outer ends of the slanted sections 40 are fixedly coupled to inner ends of the annular side sections 28 of the outer annular portion 24. Inner ends of the slanted sections 40 are fixedly coupled to radially outer ends of the inner attachment element 42. The inner attachment element 42 forms a curved inner periphery of the rim 16. The inner attachment element 42 preferably has the plurality of inner attachment openings 43 formed therein. The inner attachment element 42 also preferably includes a single valve aperture 45 formed therein for coupling the valve 38 thereto, as seen in FIGS. 1 and 25.

The inner attachment element 42 preferably has sixteen (16) of the inner attachment openings 43 formed therein. The inner attachment openings 43 are equally spaced apart in the circumferential direction, and radially aligned with the outer attachment openings 33 to be coupled with the front central hub 20 by the spokes 14. The inner attachment openings 43 extend between an annular outwardly facing surface 42a and an annular inwardly facing surface 42b of the inner attachment element 42. Each inner attachment opening 43 preferably extends in the radial direction and is dimensioned to receive one of the reinforcement members 13 therein. Moreover, each inner attachment opening 43 is preferably spaced from and radially aligned with one of the outer attachment openings 33. The inner attachment openings 43 are preferably smaller than the outer attachment openings 33, as discussed in more detail below. When the reinforcement members 13 are fixedly coupled in the inner attachment openings 43, the outwardly and inwardly facing surfaces 42a and 42b engage the reinforcement members 13, as discussed below. The outwardly and inwardly facing surfaces 42a and 42b can be considered first and second inner rim surfaces, respectively.

Referring now to FIGS. 3–11, the reinforcement members 13 will now be discussed in more detail. As mentioned above, the reinforcement members 13 are preferably identical members that are deformed in order to permanently secure the reinforcement members 13 to the rim 16. Each reinforcement member 13 is preferably constructed as a one-piece unitary member from a lightweight, rigid yet malleable metallic material. Thus, the reinforcement members 13 can be deformed when secured to the rim 16, and provide rigid reinforcement to the rim 16. In this embodiment, each of the reinforcement members 13 has an original or pre-formed shape as shown in FIGS. 4, 5 and 8–10, and a deformed shape as seen in FIGS. 3, 6, 7 and 11. All of the reinforcement members 13 are preferably identical to each other. Thus, only one of the reinforcement members 13 will be discussed and/or illustrated in detail herein.

Figure 9:
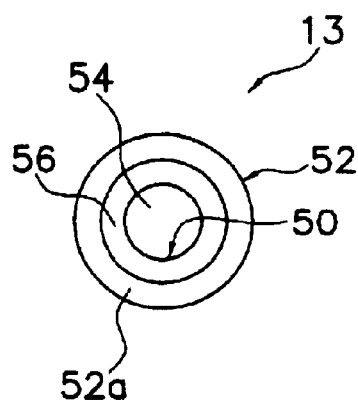
FIG. 9 is an outer end elevational view of the reinforcement member illustrated in FIG. 8.

The pre-formed shape of the reinforcement members 13 as shown in FIGS. 4, 5 and 8–10 will first be discussed. Each reinforcement member 13 is preferably a tubular step-shaped member having an inner or first tubular portion 50, an outer or second tubular portion 52 and a stepped interior passageway 54 extending through the first and second tubular portions 50 and 52, prior to deforming the reinforcement members 13 to fixedly couple the rim 16 thereto. Preferably, each reinforcement member 13 has a circular shape as seen in the longitudinal direction (FIG. 9). Moreover, the first and second tubular portions 50 and 52 preferably have constant, circular cross-sections, prior to deformation.

Figure 10:
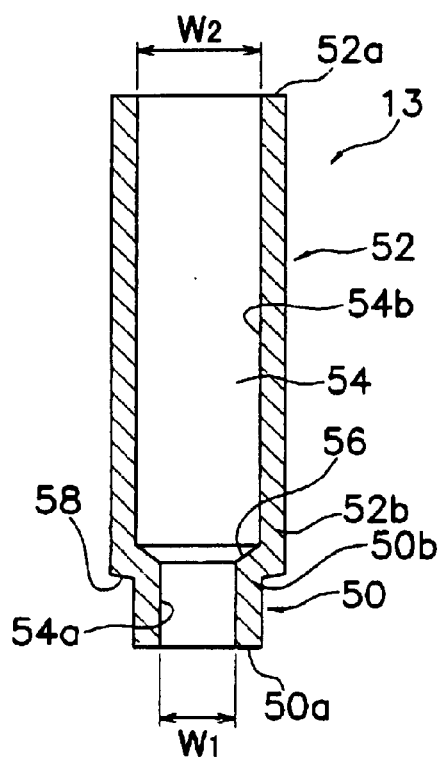
FIG. 10 is a cross-sectional view of the reinforcement member illustrated in FIGS. 8 and 9, as seen along section line 10—10 of FIG. 8.

The first tubular portion 50 includes a first free end 50a and a first attachment end 50b fixedly coupled to the second tubular portion 52. The first free end 50a forms part of a first or inner end of each reinforcement member 13. The second tubular portion 52 includes a second free end 52a and a second attachment end 52b fixedly coupled to the first attachment end 50b. The interior passageway 54 preferably includes an inner tubular section 54a formed at the interior of the first tubular portion 50 and an outer tubular section 54b formed at the interior of the second tubular portion 52. The inner tubular section 54a has a first maximum width $W_1$ and the outer tubular section 54b has a second maximum width $W_2$ larger than the first maximum width $W_1$ as seen in FIG. 10. Because the reinforcement members 13 are preferably circular shaped, the maximum widths $W_1$ and $W_2$ are preferably maximum diameters.

Due to the configurations of the inner and outer tubular section 54a and 54b of the interior passageway 54, an annular internal abutment surface 56 is preferably pre-formed between the first and second tubular portions 50 and 52 within the interior passageway 54 (i.e., between the inner and outer tubular sections 54a and 54b). The internal abutment surface 56 is designed to engage an enlarged head of one of the spokes 14, as discussed below. Similarly, an annular external abutment or retaining surface 58 is preferably pre-formed between the first and second tubular portions 50 and 52. The external retaining surface 58 is designed to engage the inner attachment element 42 of the rim 16.

Figure 4:
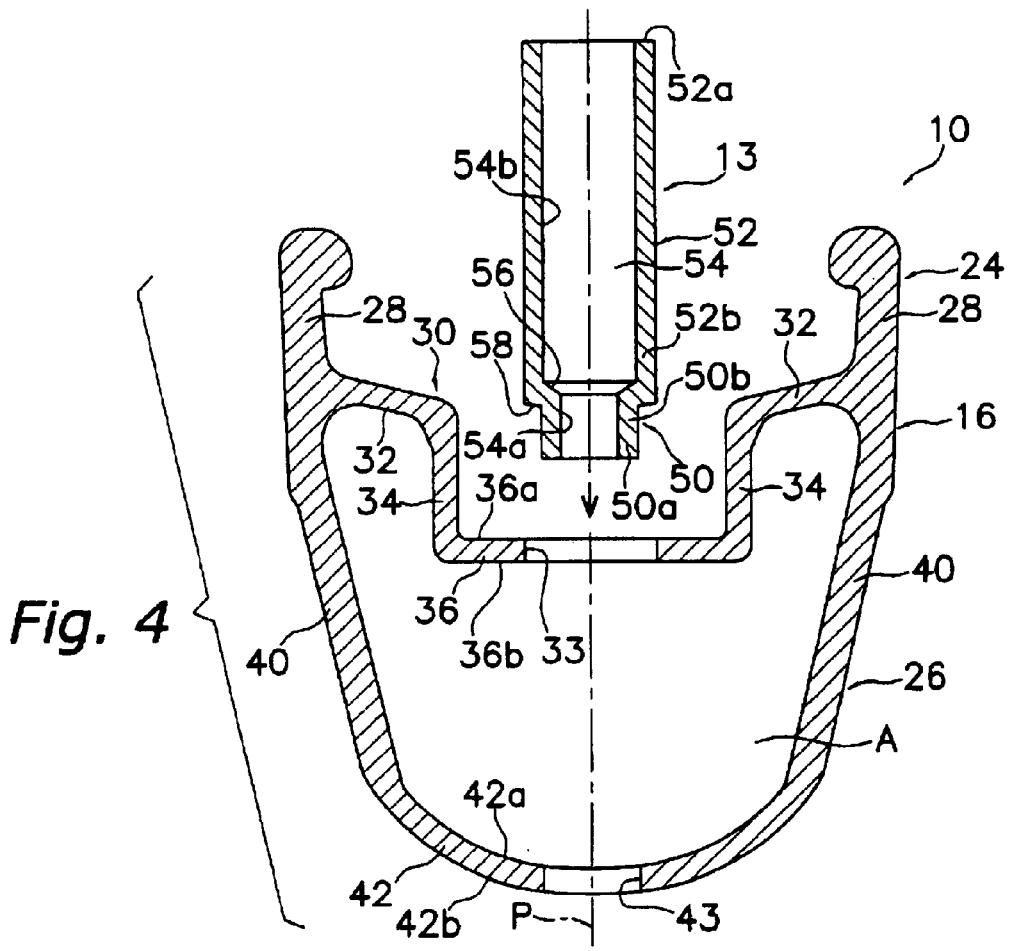
FIG. 4 is a partial, exploded cross-sectional view of the bicycle wheel illustrated in FIG. 3, prior to inserting one of the reinforcement members in a pair of spoke openings (i.e., one inner and one outer spoke opening) of the rim.
Figure 5:
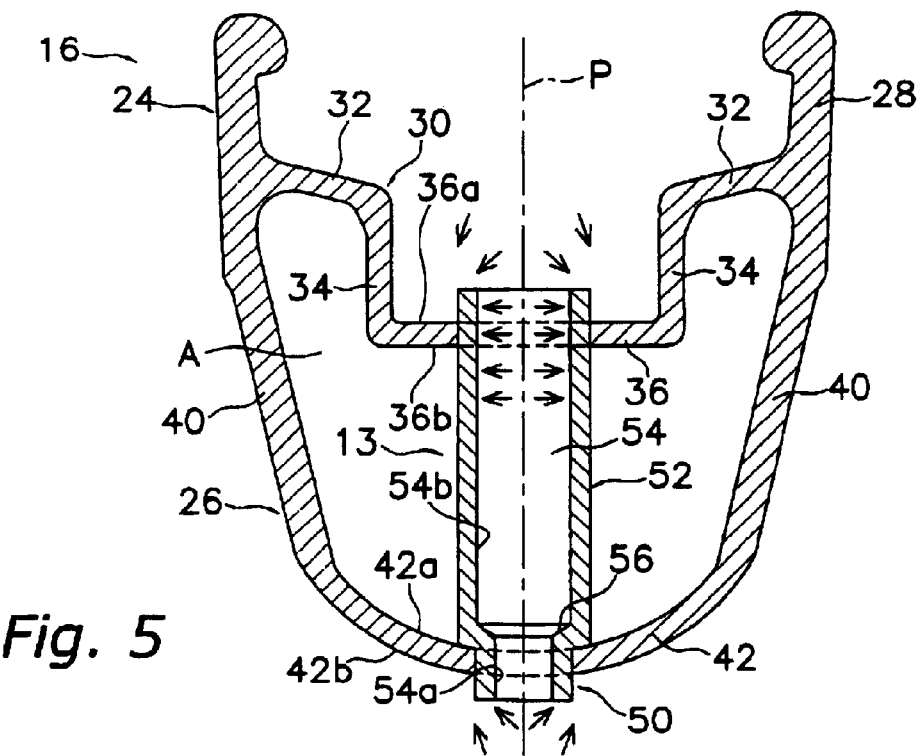
FIG. 5 is a partial cross-sectional view of the rim and reinforcement member illustrated in FIGS. 3 and 4, after inserting one of the reinforcement members in the pair of spoke openings of the rim.
Figures 6, 7:
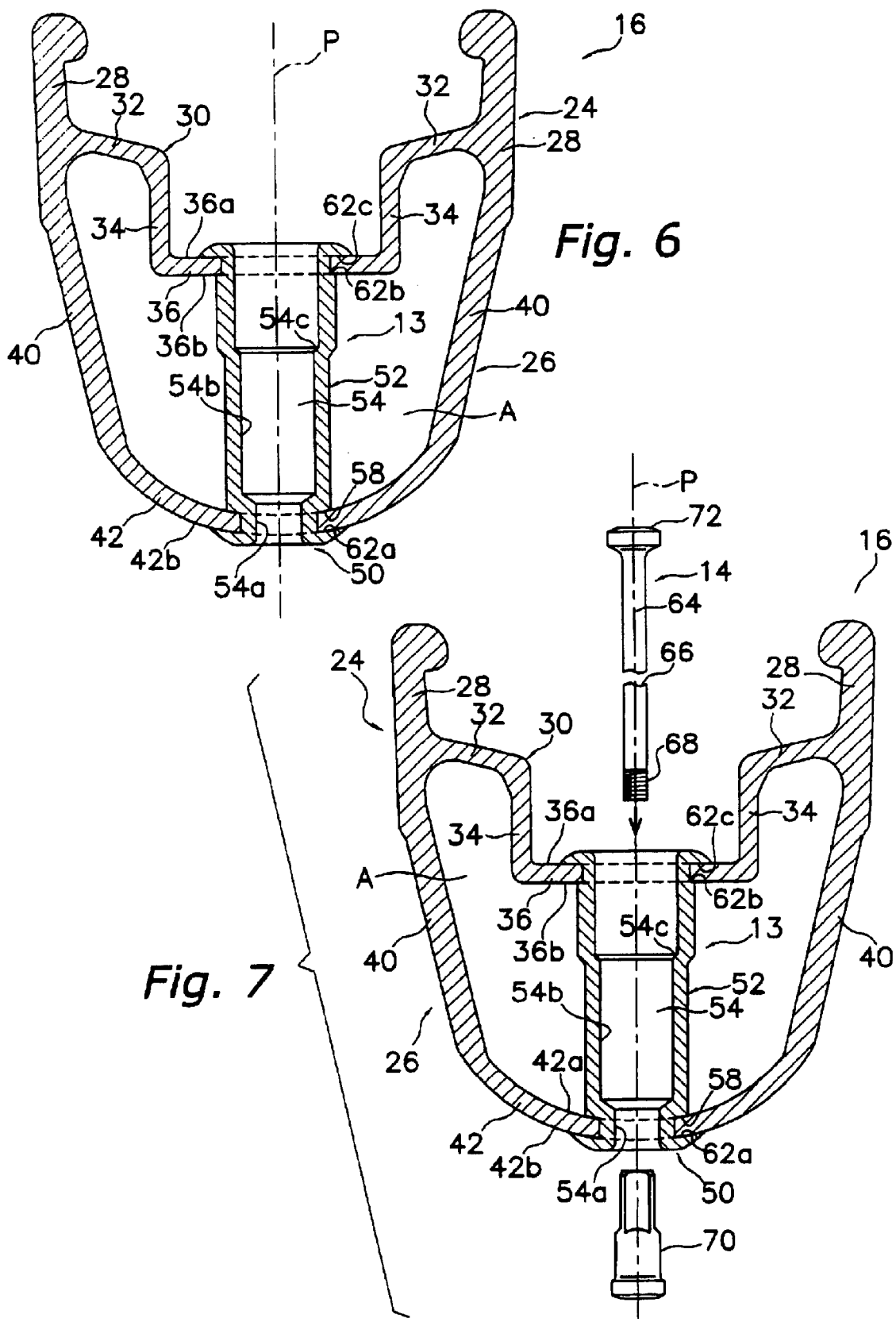
FIG. 6 is a partial cross-sectional view of the rim and the reinforcement member illustrated in FIGS. 3–5, after deforming the reinforcement members within the pair of spoke openings of the rim.
FIG. 7 is a partial, exploded cross-sectional view of the rim and the reinforcement member illustrated in FIGS. 3–6, prior to inserting a spoke into an interior passageway of one of the reinforcement members.
Figure 8:
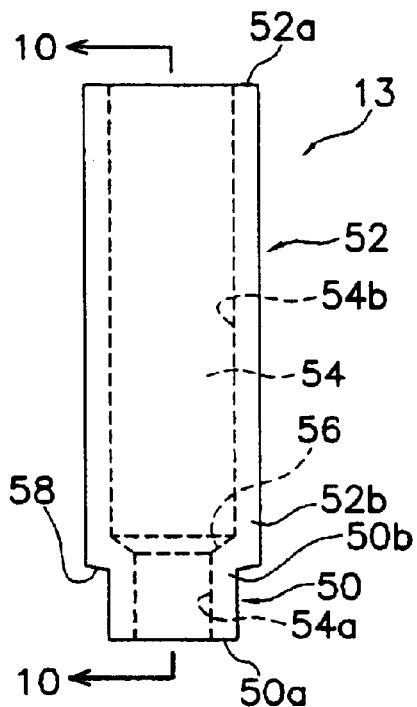
FIG. 8 is an enlarged, side elevational view of the reinforcement member illustrated in FIGS. 3–7, prior to deformation.

Specifically, the external retaining surface 58 is designed to contact/engage the outwardly facing surface 42a of the inner attachment element 42 of the rim 16. The first tubular portion 50 is sized to be slidably received in one of the inner attachment openings 43, while the second tubular portion 52 is sized to be slidably received in one of the outer attachment openings 33, as seen in FIGS. 4 and 5. Since the first tubular portion 50 is smaller than the second tubular portion 52, the first tubular portion 50 is also easily received through one of the outer attachment openings 33. The first tubular portion 50 and the retaining surface 58 form an inner end of the reinforcement member 13, while the second free end 52a of the second tubular portion 52 forms an outer end of the reinforcement member 13.

After each reinforcement member 13 is positioned in the outer and inner attachment openings 33 and 43 (FIG. 5), the reinforcement member 13 is deformed to permanently secure the reinforcement member 13 to the rim 16, as seen in FIGS. 3, 6, 7 and 11. The structure of the reinforcement members 13 after deformation will now be discussed in more detail.

Basically, after deformation, each reinforcement member 13 still includes the first tubular portion 50, the second tubular portion 52 and the interior passageway 54, but with modified/deformed shapes. In particular, the first and second tubular portions 50 and 52 do not have constant cross-sections after deformation. However, the first and second tubular portions 50 and 52 are still circular-shaped after deformation. Specifically, a section of the interior passageway 54 is preferably enlarged/expanded using a mandrel, and the first and second free ends 50a and 52a are preferably deformed by riveting to deform the reinforcement members 13 into the shape illustrated in FIGS. 3, 6, 7 and 11.

More specifically, part of the outer tubular section 54b of the interior passageway 54 is preferably enlarged/expanded adjacent the second free end 52a to create an additional internal abutment surface 54c. The additional annular internal abutment is designed to engage an optional seal member 60, illustrated in FIG. 3 and discussed below. Thus, if a tubeless tire 19 is used, a seal member 60 is mounted in each of the reinforcement members 13. If a tube-type tire is used, the seal members 60 are not necessary. The shapes of the attachment ends 50b and 52b of the first and second tubular portions 50 and 52 do not change during deformation. Thus, the internal abutment surface 56 and the retaining surface 58 preferably have the same sizes/shapes before and after deformation of the reinforcement member 13. Moreover, much of the interior passageway 54 has the same size/and shape before and after deformation of the reinforcement member 13.

Figure 11:
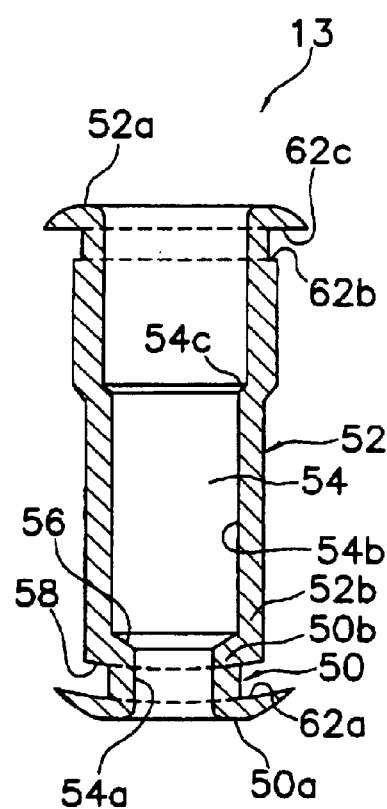
FIG. 11 is a cross-sectional view of the reinforcement member illustrated in FIGS. 8–10 as seen along section line 10—10 of FIG. 8, after deformation but with the rim removed for the purpose of illustration.
Figure 12:
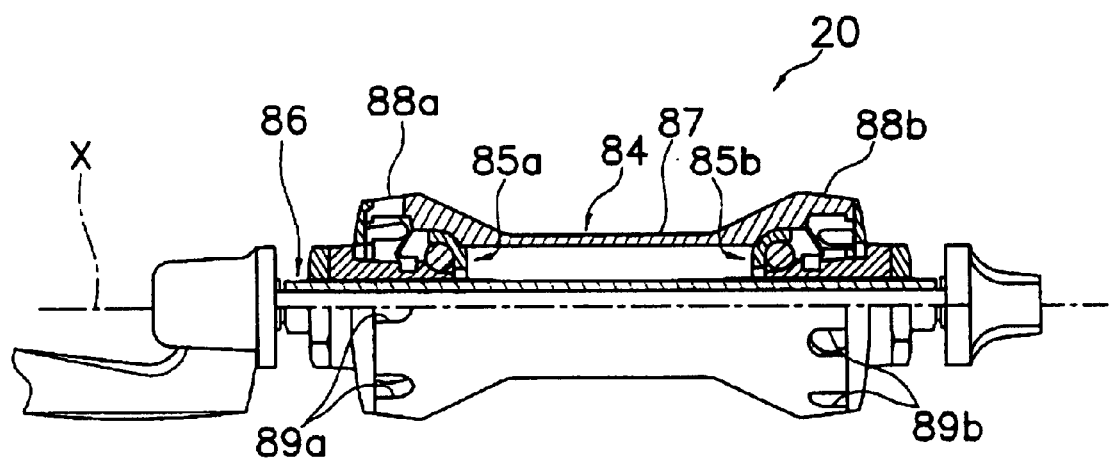
FIG. 12 is an enlarged, top plan view a front hub of the bicycle wheel illustrated in FIG. 1 with portions shown in cross-section for the purpose of illustration.
Figure 13:
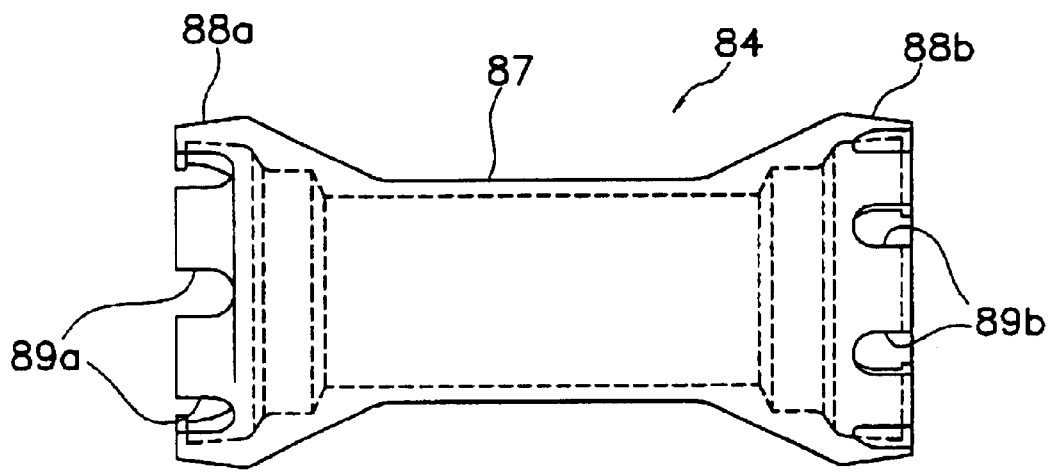
FIG. 13 is an enlarged, top plan view of the hub body of the front hub illustrated in FIG. 12.
Figure 14:
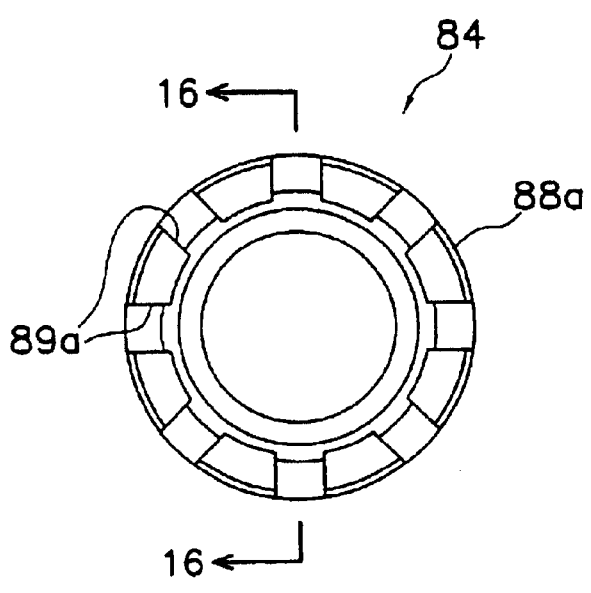
FIG. 14 is a left side elevational view of the hub body illustrated in FIG. 13.
Figure 15:
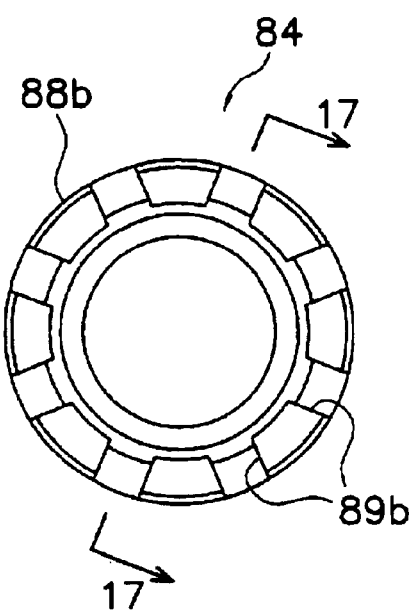
FIG. 15 is a right side elevational view of the hub body illustrated in FIGS. 13 and 14.
Figure 16:
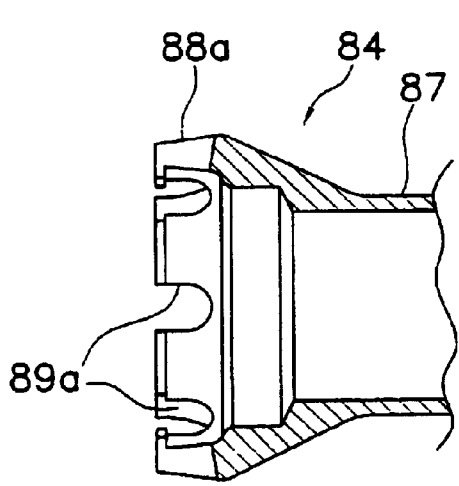
FIG. 16 is a partial cross-sectional view of the hub body illustrated in FIGS. 13–15, as seen along section line 16—16 of FIG. 14.
Figure 17:
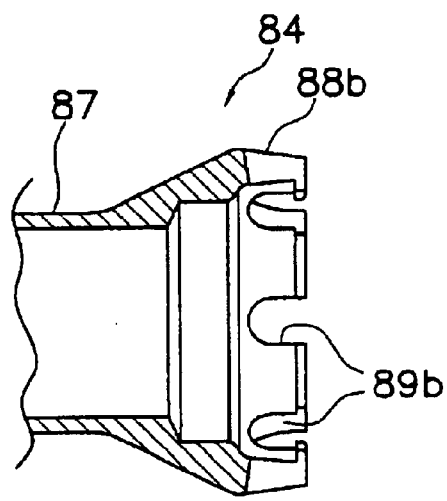
FIG. 17 is a partial cross-sectional view of the hub body illustrated in FIGS. 13–16, as seen along section line 17—17 of FIG. 15.
Figure 18:
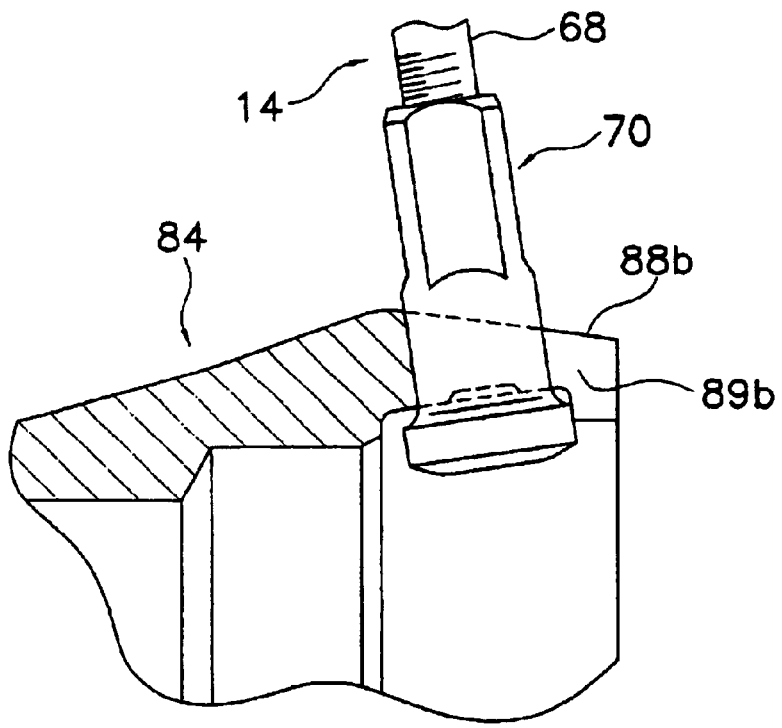
FIG. 18 is a partial, enlarged cross-sectional view of a portion of the hub body illustrated in FIG. 13–17 with a spoke nipple arranged in a spoke hole.
Figure 19:
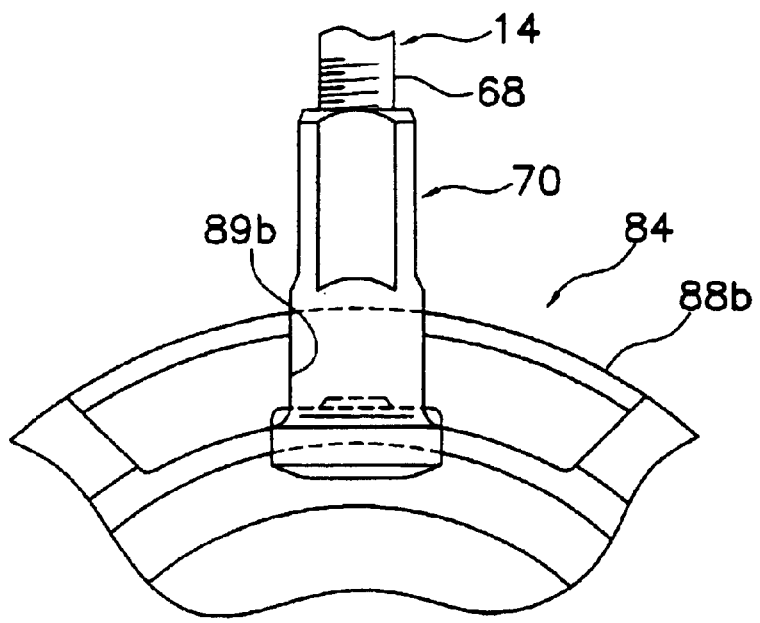
FIG. 19 is a right side elevational view of the portion of the hub body and spoke nipple illustrated in FIG. 18.
Figure 20:
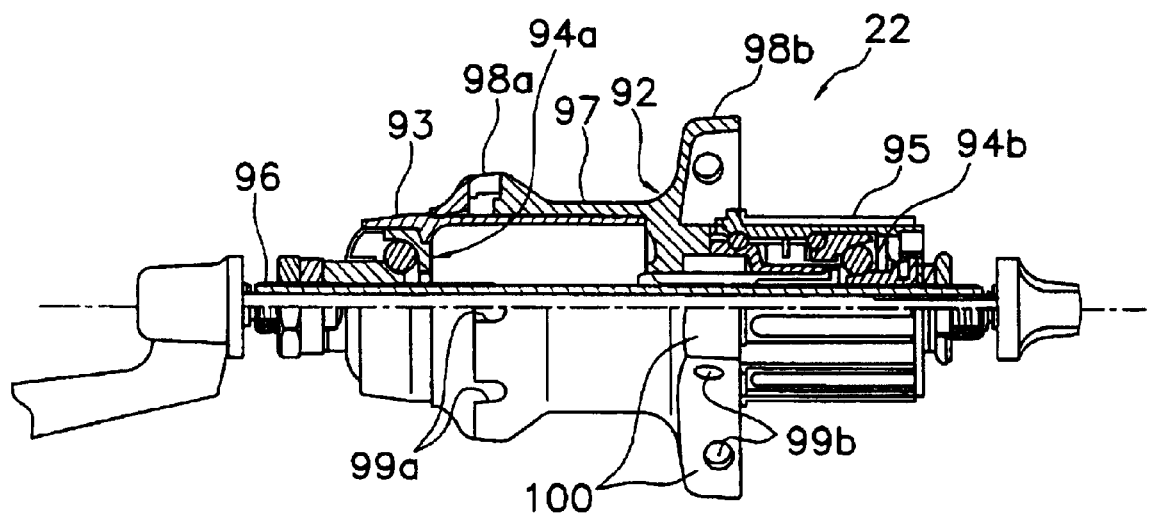
FIG. 20 is an enlarged, top plan view of a rear hub of the rear bicycle wheel illustrated in FIG. 2 with portions shown in cross-section for the purpose of illustration.
Figure 21:
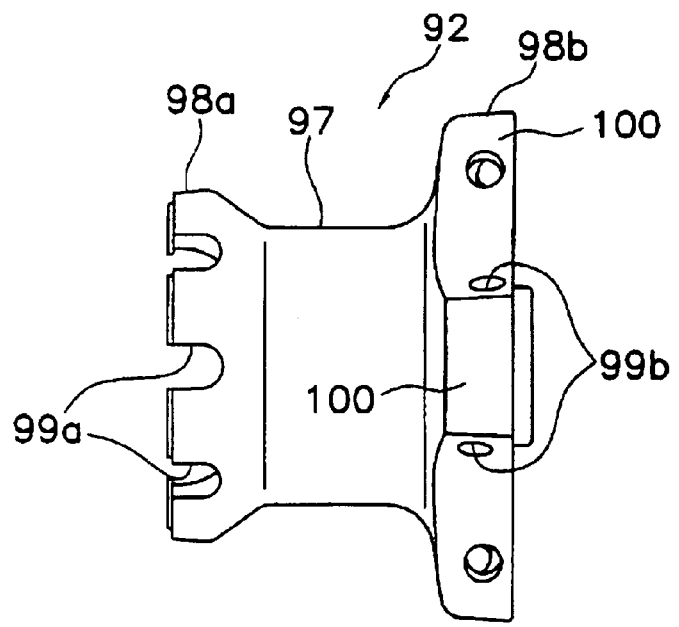
FIG. 21 is an enlarged, top plan view of the hub body of the rear hub illustrated in FIG. 20.

As best seen in FIG. 11, each reinforcement member 13 includes several additional external abutment or retaining surfaces after deformation. Specifically, each reinforcement member 13 includes an inner retaining surface 62a, and a pair of outer retaining surface 62b and 62c. Because the retaining surfaces 62a, 62b and 62c are created during the deformation of the reinforcement members 13 onto the rim 16, these retaining surfaces 62a, 62b and 62c are considered deformed surfaces. Each reinforcement member 13 also includes the pre-formed retaining surface 58, which is not created during the deformation of the reinforcement members 13 onto the rim 16. Thus, term "pre-formed" as used herein refers to deformation occurring prior to the attachment process of securing the reinforcement members 13 to the rim 16. The term "deformed" as used herein refers to deformation occurring during the attachment process of securing the reinforcement members 13 to the rim 16. These retaining surfaces 58, 62a, 62b and 62c of each reinforcement members 13 secure/retain the inner and outer ends of the reinforcement members 13 against inward and outward radial movement after deformation of the reinforcement members 13.

The retaining surface 58 faces radially inwardly to contact the outwardly facing surface 42a of the inner attachment element 42, while the retaining surface 62a faces radially outwardly to contact the inwardly facing surface 42b of the inner attachment element 42. The retaining surface 58 can be considered a first inner retaining surface, while the retaining surface 62a can be considered a second inner retaining surface. Similarly, the retaining surface 62c faces radially inwardly to contact the outwardly facing surface 36a of the outer attachment element 36, while the retaining surface 62b faces radially outwardly to contact the inwardly facing surface 36b of the outer attachment element 36. The retaining surface 62c can be considered a first outer retaining surface, while the retaining surface 62b can be considered a second outer retaining surface.

In this embodiment, the retaining surface 58, the outwardly facing surface 42a of the inner attachment element 42, the retaining surface 62a and the inwardly facing surface 42b of the inner attachment element 42 form an inner connection between each reinforcement member 13 and the rim 16. The inner connection prevents inward and outward movement of the inner end of each reinforcement member 13 relative to the inner annular portion 26 of the rim 16. Similarly, the retaining surface 62c, the outwardly facing surface 36a of the outer attachment element 36, the retaining surface 62b and the inwardly facing surface 36b of the outer attachment element 36 form an outer connection between each reinforcement member 13 and the rim 16. The outer connection prevents inward and outward movement of the outer end of each reinforcement member 13 relative to the outer annular portion 24 of the rim 16.

The interior passageway 54 with the internal abutment surface 56 of each of the reinforcement members 13 is designed to retain an outer end of one of the spokes 14 therein. Preferably, each interior passageway 54 extends in the radial direction, but is large enough such that the spoke 14 mounted therein can be slightly angled relative to the center plane P, i.e., to extend to one side of the hub 20.

Referring now to FIGS. 1, 3, 7, 18 and 19, the spokes 14 will now be discussed in more detail. The spokes 14 are preferably identical to each other. Each of the spokes 14 basically includes an outer end portion 64, a center or a middle portion 66, an inner end portion 68 and a spoke nipple 70. The outer end portion 64, the center portion 66, and the inner end portion 68 of each spoke 14 are preferably integrally formed together as a one piece, unitary member. The spoke nipples 70 are preferably formed as separate members.

Each of the outer end portions 64 of the spokes 14 has an enlarged head 72 designed to engage one of the internal abutment surfaces 56 of one of the reinforcement members 13, while each of the inner end portions 68 of the spokes 14 preferably has external threads with one of the spoke nipples 70 threadedly coupled thereto. The spokes 14 are placed under tension between the hub 20 and the annular rim 16 by rotating the spoke nipples in a conventional manner. The spokes 14 are preferably conventional wire-type spokes. Thus, the spokes 14 will not be discussed and/or illustrated in detail herein except as related to the rim 16 of the present invention.

The connections of the spokes 14 to the hubs 20 and 22 will now be discussed in more detail. The connections of the spokes 14 to the hubs 20 and 22 are basically identical to the connections disclosed in U.S. Pat. No. 6,431,658, except as explained below. In particular, the hubs 20 and 22 are slightly modified versions of the front and rear hubs disclosed in U.S. Pat. No. 6,431,658, which are designed to be used with the rims 16 and 18 having circumferentially equally spaced spoke attachment points.

Referring to FIGS. 1 and 12–19, the connections of the spokes 14 and the rim 16 to the front hub 20 will now be discussed in more detail. The front hub 20 basically includes a tubular hub body portion 84, first and second bearing assemblies 85a and 85b, and a hub axle 86 rotatably supported in tubular body portion 84 by the bearing assemblies 85a and 85b. The parts of the front hub 20 are relatively conventional. Thus, the parts of the front hub 20 will not be discussed or illustrated in detail herein.

The tubular body portion 84 has a tubular center portion 87 and a pair of tubular mounting portions 88a and 88b at opposite ends of the center portion 87 for mounting the spokes 14 thereto. Each tubular mounting portion 88a and 88b has a plurality of spoke openings 89a and 89b for coupling the spokes 14 therein, respectively. Preferably, each mounting portion 88a and 88b has eight spoke openings 89a and 89b formed therein, respectively.

Preferably, the second mounting portion 88b is an offset mirror image of first mounting portion 88a. Thus, the spoke openings 89b are preferably circumferentially offset from the spoke openings 89a so that the outer end portions 64 of the spokes 14 are circumferentially equally spaced from each other at the rim 16. The tubular mounting portions 88a and 88b support the spokes 14 in spoke openings 89a and 89b with the spoke nipples 70.

Referring to FIGS. 2 and 20–24, the connections of the spokes 14 and the rim 18 to the rear hub 22 will now be discussed in more detail. The rear hub 22 basically includes a tubular hub body portion 92, a bearing support sleeve 93, a first bearing assembly 94a, a second bearing assembly 94b, a freewheel mounting portion 95 and a hub axle 96. The hub axle 96 is rotatably supported in the tubular body portion 92 by the bearing assemblies 94a and 94b. The freewheel mounting portion 95 is coupled to the body portion 92 in a conventional manner and has a plurality of splines for receiving a freewheel (not shown). The parts of the rear hub 22 are relatively conventional. Thus, the parts of the rear hub 22 will not be discussed and/or illustrated in detail herein.

The tubular body portion 92 has a tubular center portion 97 and a pair of tubular mounting portions 98a and 98b fixedly coupled to opposite ends of the center portion 97 for mounting the spokes 14 thereto. The second mounting portion 98b is different from the first mounting portion 98a so that a freewheel (not shown) can be coupled to the rear hub 22. Each tubular mounting portion 98a and 98b has a plurality of spoke openings 99a and 99b for coupling the spokes 14 thereto. Preferably, each mounting portion 98a and 98b has eight of the spoke openings 99a and 99b formed therein, respectively. The tubular mounting portions 98a and 98b support a plurality of spokes 14 in the spoke openings 99a and 99b by the spoke nipples 70. The first mounting portion 98a is identical to the first mounting portion 88a of the front hub 20, except that first mounting portion 98a has larger inner and outer diameters than the first mounting portion 88a. The mounting portion 98b is formed of a plurality of spoke attachment projections 100 and a tapered portion. The second mounting portion 98b is arranged on an opposite side of center portion 97 from the first mounting portion 98a. Preferably, the mounting portion 98b has four spoke attachment projections 100 with a pair of opposing closed spoke openings 99b formed in each spoke attachment projection 100 for attaching eight of the spokes 14 thereto. The spoke attachment projections 100 are preferably circumferentially aligned with alternating spoke openings 99a of the first mounting portion 98a to provide the proper spoking arrangement.

As mentioned above, the rim 18 of the rear wheel 12 is identical to the rim 16 of the front wheel 10, even though some of the spokes 14 of the rear wheel 12 are arranged at slightly different angles than the spokes 14 of the front wheel 10. In other words, the configuration of each reinforcement members 13 allows the spokes 14 to be angled slightly to attach to opposite sides of the hub 20 or 22 tangentially or radially.

The method of making the rim 16 will now be discussed in more detail. It will be apparent to those skilled in the art from this disclosure that the method of making rim 18 is identical to the method of making the rim 16.

When making the rim 16, the material of the outer and inner annular portions 24 and 26 is preferably extruded through a die to form an elongated strip of the rim material using conventional manufacturing techniques. The rim material is preferably extruded in the overall cross-sectional shape of the outer and inner annular portions 24 and 26. The elongated strip of rim material is then cut to the desired length and shaped into an annulus. The ends of cut strip of rim material are then bonded together by welding or any suitable manufacturing technique to create a continuous annular-shaped rim. The outer and inner attachment holes 33 and 43 are preferably formed in the rim material by drilling or punching. The holes can be formed anytime after the rim material is extruded as needed and/or desired.

The reinforcement members 13 are preferably formed separately by casting or any suitable manufacturing technique. The reinforcement members 13 are preferably mounted in the attachment holes 33 and 43 after the ends of the rim strip material are bonded together. The reinforcement members 13 are then deformed to permanently secure the reinforcement members 13 to the outer and inner annular portion 24 and 26. Preferably, the reinforcement members 13 are deformed using a mandrel and riveting, as mentioned above. The rim 18 is made in a manner identical to the rim 16. The preferred forces exerted on the reinforcement members 13 are illustrated with arrows in the drawings.

Of course, it will be apparent to those skilled in the art from this disclosure that additional steps can be performed when making the rim 16. Moreover, it will be apparent to those skilled in the art from this disclosure that the steps when making the rim 16 can be performed in any order as needed and/or desired.

SECOND EMBODIMENT

Referring to FIGS. 26–30, part of a modified bicycle rim 216 is illustrated in accordance with a second embodiment of the present invention. The rim 216 is identical to the rim 16 of the first embodiment, except that the rim 216 utilizes a plurality of modified reinforcement members 213 (only one shown). In particular, each of the reinforcement members 213 has a modified shape prior to deformation. However, the rim 216 is made using a method identical to the first embodiment, and the reinforcement members 213 have a deformed shape identical to the deformed shape of the reinforcement members 13 of the first embodiment. In view of these similarities, the rim 216 and the method of making the rim 216 will not be discussed and/or illustrated in detail herein. Rather, the following description will focus mainly on the differences.

While only one reinforcement member 213 is discussed and/or illustrated in detail herein, it will be apparent to those skilled in the art from this disclosure that the rim 216 includes a plurality of reinforcement members 213. Moreover, it will be apparent to those skilled in the art from this disclosure that the descriptions and/or illustrations of the rim 16 with the reinforcement members 13 of the first embodiment also apply to this second embodiment, except as explained below. It will also be apparent to those skilled in the art from this disclosure that the optional seal members 60 can be used with this arrangement, if a tubeless tire is desired. The rim 216 is designed to be used with either of the hubs 20 or 22.

Each reinforcement member 213 is identical to the reinforcement members 13 of the first embodiment after deformation of the reinforcement members 213. Thus, the descriptions and illustrations of the deformed reinforcement members 13 also apply to the deformed reinforcement members 213 of this second embodiment. Thus, the deformed reinforcement members 213 will not be discussed and or illustrated in detail herein. However, the reinforcement members 213 have a modified shape prior to deformation, as mentioned above.

Specifically, prior to deformation, each of the reinforcement members 213 is preferably a tubular step-shaped member having a pair of first tubular portions 250, a second tubular portion 252 and a stepped interior passageway 254 extending through the first and second tubular portions 250 and 252, prior to deforming the reinforcement members 213. Each of the first tubular portions 250 is identical to the first (inner) tubular portion 50 of the first embodiment. The second tubular portion 252 is identical to the second (outer) tubular portion 52 of the first embodiment except the second tubular portion 252 is shorter, due to the presence of two (2) first tubular portions 250. Thus, two internal abutment surfaces 256 are formed between a pair of first tubular sections 254a and a second tubular section 254b of the internal passageway 254. Also, two external retaining surfaces 258 are formed between the first tubular portions 250 and the second tubular portion 252 prior to deformation.

The internal abutment surfaces 256 are identical to the internal abutment surface 56 of the first embodiment. The external retaining surfaces 258 are also identical to the external retaining surface 58 of the first embodiment. In other words, the first tubular portions 250 form the inner/outer ends of the reinforcement members 213 prior to deformation such that either end can be the radially inner end. Preferably each reinforcement member 213 has a circular shape. Moreover, each of the first and second tubular portions 250 and 252 preferably has constant, circular cross-sections, prior to deformation.

THIRD EMBODIMENT

Referring to FIGS. 31–38, part of a modified bicycle rim 316 is illustrated in accordance with a third embodiment of the present invention. The rim 316 is identical to the rim 16 of the first embodiment, except that the rim 316 utilizes a modified outer annular portion 324 and a plurality of modified reinforcement members 313 (only one shown) with threaded outer ends. Thus, each of the reinforcement members 313 has a modified shape prior to deformation. Also, the rim 316 is made using a modified version of the method used to make the rim 16 of the first embodiment. Thus, the reinforcement members 313 also have modified deformed shapes. However, the reinforcement members 313 function in a manner very similar to the reinforcement members 13 of the first embodiment. In view of these similarities, the rim 316 and the method of making the rim 316 will not be discussed and/or illustrated in detail herein. Rather, the following description will focus mainly on the differences.

While only one reinforcement member 313 is discussed and/or illustrated in detail herein, it will be apparent to those skilled in the art from this disclosure that the rim 316 includes a plurality of reinforcement members 313. Moreover, it will be apparent to those skilled in the art from this disclosure that the descriptions and/or illustrations of the rim 16 with the reinforcement members 13 of the first embodiment also apply to this third embodiment, except as explained below. It will also be apparent to those skilled in the art from this disclosure that the optional seal members 60 can be used with this arrangement, if a tubeless tire is desired. The rim 316 is designed to be used with either of the hubs 20 or 22.

Each reinforcement member 313 is preferably a tubular step-shaped member having a first tubular portions 350, a second tubular portion 352 and a stepped interior passageway 354 extending through the first and second tubular portions 350 and 352, prior to deforming the reinforcement members 313. The first tubular portion 350 is identical to the first (inner) tubular portion 50 of the first embodiment. The second tubular portion 352 is identical to the second (outer) tubular portion 52 of the first embodiment, except that the second tubular portion 352 includes external threads 353 and a pair of slots 355 formed in a free end 352a thereof. Also, the second tubular portion 352 is slightly shorter than the second tubular portion 52 of the first embodiment.

The slots 355 of each reinforcement member 313 are designed to engage a conventional flat head screwdriver to rotate each of the reinforcement members 313. As mentioned above, the outer annular portion 324 of the rim 316 is a modified version of the outer annular portion 24 of the first embodiment. Thus, the rim 316 basically includes the modified outer annular portion 324, an inner annular portion 326 and a plurality of the reinforcement members 313. The inner annular portion 326 is identical to the inner annular portion 26 of the first embodiment. The outer annular portion 324 includes a plurality of modified outer attachment openings 333 designed to threadedly engage the external threads 353 of the reinforcement members. Otherwise, the outer annular portion 324 is identical to the outer annular portion 24 of the first embodiment. Thus, the outer attachment openings 333 are identical to the outer attachment openings 33 of the first embodiment except the outer attachment openings 333 are threaded. In other words, the outer attachment openings 333 are preferably circumferentially equally spaced from each other, etc.

The rim 316 is made using a method identical to the first embodiment except the reinforcement members 313 are fixedly coupled to the outer annular portion 324 via a threaded outer connection by rotating the reinforcement members. The outer ends of the reinforcement members 313 are not deformed when making the rim 316 of this third embodiment.

ALTERNATE SPOKING ARRANGEMENT

Figure 39:
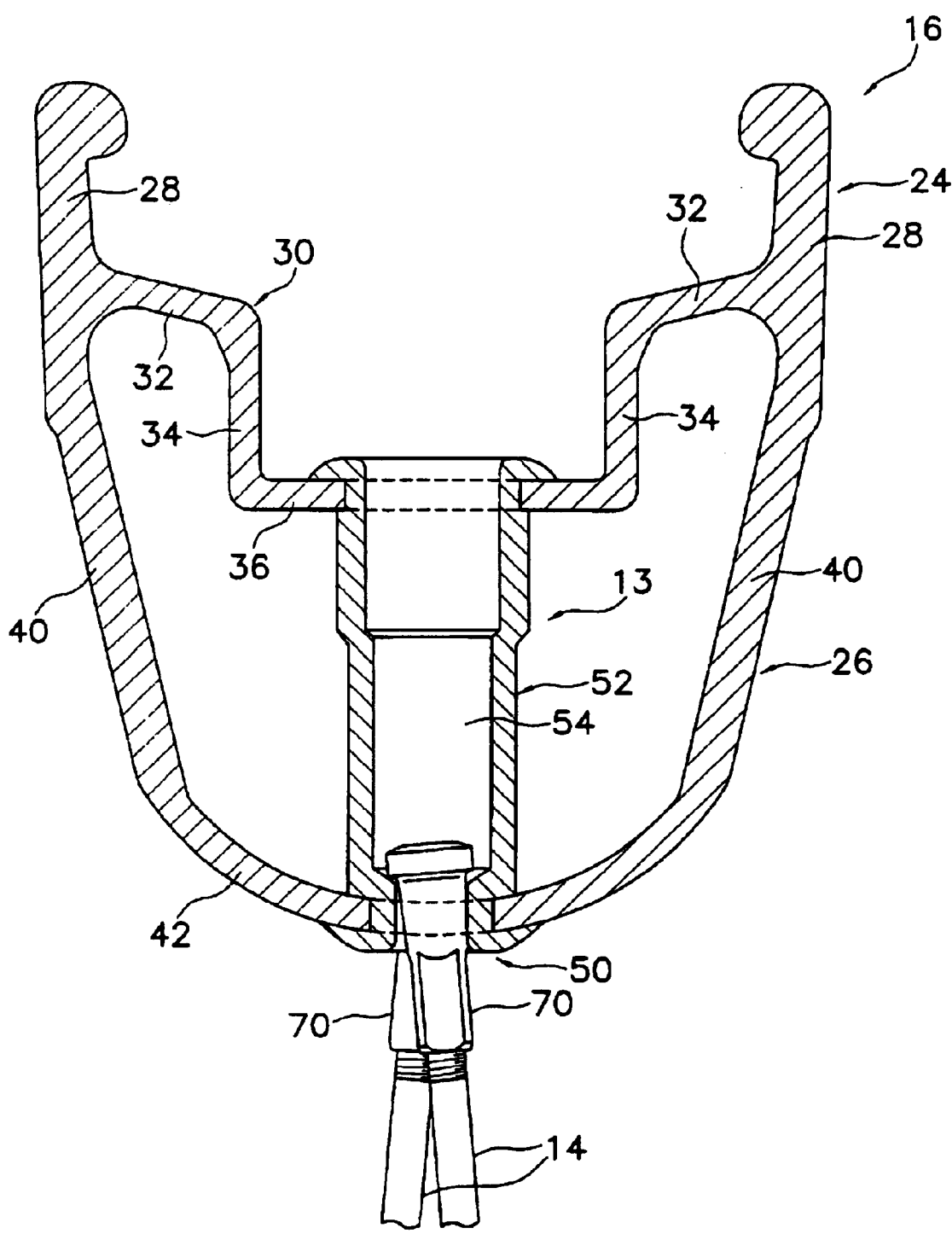
FIG. 39 is an enlarged, partial cross-sectional view of a modified bicycle wheel with a reversed spoking arrangement in accordance with a fourth embodiment of the present invention.

Referring to FIG. 39, the rim 16 illustrated with an alternate, reversed spoking arrangement in accordance with the present invention. In particular, in FIG. 39, the spokes 14 are reversed so as to be compatible with front and/or rear hubs (not shown) different from the hubs 20 and 22. In this arrangement, the spoke nipples 70 are coupled to the reinforcement members 13. Of course, it will be apparent to those skilled in the art from this disclosure that the reversed spokes 14 could be modified as needed and/or desired, depending on the type of hub used. It will also be apparent to those skilled in the art from this disclosure that the optional seal members 60 can be used with this arrangement, if a tubeless tire is desired.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rim comprising:
   an outer annular portion adapted to have a tire mounted thereon, said outer annular portion including a plurality of circumferentially spaced outer attachment openings;
   an inner annular portion fixedly coupled with said outer annular portion to form an annular hollow area therebetween, said inner annular portion including a plurality of circumferentially spaced inner attachment openings spaced from said outer attachment openings; and
   a plurality of tubular reinforcement members coupled to said inner and outer attachment openings, each of said reinforcement members including
      an inner end fixedly coupled to one of said inner attachment openings to form an inner connection that prevents inward and outward movement of said inner end relative to said inner annular portion,
      an outer end fixedly coupled to one of said outer attachment openings to form an outer connection that prevents inward and outward movement of said outer end relative to said outer annular portion, and
      an internal passageway extending between said inner and outer ends, said internal passageway having an inner tubular section and an outer tubular section located outwardly of said inner tubular section, said inner tubular section of said internal passageway having a first maximum width and said outer tubular section of said interior passageway having a second maximum width larger than said first maximum width to form an abutment surface.

2. The bicycle rim according to claim 1, wherein
said internal passageways of said reinforcement members extend substantially in a radial direction between said outer ends and said inner ends of said reinforcement members.

3. The bicycle rim according to claim 1, wherein
said inner connection of each of said reinforcement members includes a first inner retaining surface contacting a first inner rim surface of said inner annular portion of said rim that substantially faces in a radially outward direction, and a second inner retaining surface contacting a second inner rim surface of said inner annular portion of said rim that substantially faces in a radially inward direction.

4. The bicycle rim according to claim 3, wherein
said first inner retaining surface of each of said inner connections is a pre-formed surface, and
said second inner retaining surface of each of said inner connections is a deformed surface.

5. The bicycle rim according to claim 3, wherein
said outer connection of each of said reinforcement members includes a first outer retaining surface contacting a first outer rim surface of said outer annular portion of said rim that substantially faces in a radially outward direction, and a second outer retaining surface contacting a second outer rim surface of said outer annular portion of said rim that substantially faces in a radially inward direction.

6. The bicycle rim according to claim 5, wherein
said first inner retaining surface of each of said inner connections is a pre-formed surface,
said second inner retaining surface of each of said inner connections is a deformed surface,
said first outer retaining surface of each of said outer connections is a deformed surface, and
said second outer retaining surface of each of said outer connections is a deformed surface.

7. The bicycle rim according to claim 3, wherein
each of said outer connections is a threaded connection.

8. The bicycle rim according to claim 7, wherein
said first inner retaining surface of each of said inner connections is a pre-formed surface, and
said second inner retaining surface of each of said inner connections is a deformed surface.

9. The bicycle rim according to claim 7, wherein
each of said outer ends of said reinforcement members includes a transverse slot formed in a free end thereof.

10. The bicycle rim according to claim 1, wherein
said inner annular portion of said rim has a substantially U-shaped cross-section with free ends coupled to said outer annular portion to form said annular hollow area.

11. The bicycle rim according to claim 10, wherein
said outer annular portion includes an annular bridge section with said outer attachment openings formed therein and a pair of annular side sections extending outwardly from said annular bridge to form a substantially U-shaped cross-sectional shape.

12. The bicycle rim according to claim 1, wherein
said interior passageway of each of said reinforcement members includes a seal located therein.

13. The bicycle rim according to claim 1, wherein
said abutment surface of each of said reinforcement members is located closer to said inner annular portion than said outer annular portion.

14. The bicycle rim according to claim 13, wherein
said outer tubular section of said interior passageway of each of said reinforcement members is a stepped surface to form an additional abutment surface that is located closer to said outer annular portion than said inner annular portion.

15. The bicycle rim according to claim 1, wherein
each of said reinforcement members is integrally formed as a one-piece, unitary member.

16. A method of making a bicycle rim comprising:
forming an annular rim that includes an annular hollow area;
forming a plurality of outer attachment openings in an outer wall of the annular rim;
forming a plurality of inner attachment openings in an inner wall of the annular rim that is substantially opposed to the outer wall of the annular rim;
forming a plurality of reinforcement members with each reinforcement member including an inner end, an outer end and an internal passageway extending between the inner end and the outer end, each longitudinal passageway having an inner tubular section and an outer tubular section with a maximum width larger than a maximum width of the inner tubular section to form an abutment surface;

securing the inner ends of the reinforcement members to the inner spoke attachment openings to prevent inward and outward movement of the inner ends of the reinforcement members relative to the inner spoke attachment openings; and securing the outer ends of the reinforcement members to the outer spoke attachment openings to prevent inward and outward movement of the outer ends of the reinforcement members relative to the outer spoke attachment openings.

17. The method according to claim 16, wherein the securing of the inner ends of the reinforcement members to the inner spoke attachment openings is achieved by first pre-forming a first inner retaining surface on each of the reinforcement members, installing the reinforcement members within the inner spoke attachment openings such that the first inner retaining surfaces contact a first inner rim surface of the inner wall that faces substantially radially outwardly, and then by deforming the inner end of each of the reinforcement members to create a second inner retaining surface that contacts a second inner rim surface of the inner wall that faces substantially radially inwardly.

18. The method according to claim 17, wherein the securing of the outer ends of the reinforcement members to the outer spoke attachment openings is achieved by deforming the outer end of each of the reinforcement members to create first outer retaining surface that contacts a first outer rim surface of the outer wall that faces substantially radially outwardly, and by deforming the outer end of each of the reinforcement members to create second outer retaining surface that contacts a second outer rim surface of the outer wall that faces substantially radially inwardly.

19. The method according to claim 17, wherein the securing of the outer ends of the reinforcement members to the outer spoke attachment opening is achieved by threading each of the outer ends into one of the outer spoke attachment openings.

20. The method according to claim 19, wherein the forming of the reinforcement members creates a transverse slot formed in a free end of each of the outer ends of the reinforcement members.

21. The method according to claim 16, wherein the securing of the outer ends of the reinforcement members to the outer spoke attachment openings is achieved by deforming the outer end of each of the reinforcement members to create first outer retaining surface that contacts a first outer rim surface of the outer wall that faces substantially radially outwardly, and by deforming the outer end of each of the reinforcement members to create second outer retaining surface that contacts a second outer rim surface of the outer wall that faces substantially radially inwardly.

22. The method according to claim 16, wherein the securing of the outer ends of the reinforcement members to the outer spoke attachment opening is achieved by threading each of the outer ends into one of the outer spoke attachment openings.

23. The method according to claim 22, wherein the forming of the reinforcement members creates a transverse slot formed in a free end of each of the outer ends of the reinforcement members.

24. The method according to claim 16, further comprising:

providing a plurality of spokes with each spoke having a shaft extending from an enlarged head; and installing the spokes within the interior passageways of the reinforcement members by inserting the shaft of each spoke through one of the interior passageways to retain the enlarged head of each spoke on the abutment surface of one of the reinforcement members.

25. The method according to claim 24, wherein the providing of each enlarged head is achieved by integrally forming an enlarged head with one of the shafts.

26. The method according to claim 24, wherein the providing of each enlarged head is achieved by threading a spoke nipple with an enlarged section onto one of the shafts.

27. A bicycle rim comprising:

an outer annular portion adapted to have a tire mounted thereon, said outer annular portion including a plurality of circumferentially spaced outer attachment openings;

an inner annular portion fixedly coupled with said outer annular portion to form an annular hollow area therebetween, said inner annular portion including a plurality of circumferentially spaced inner attachment openings spaced from said outer attachment openings; and a plurality of tubular reinforcement members coupled to said inner and outer attachment openings, each of said reinforcement members including an inner end fixedly coupled to one of said inner attachment openings to form an inner connection having a first inner retaining surface contacting a first inner rim surface of said inner annular portion of said rim that substantially faces in a radially outward direction and a second inner retaining surface contacting a second inner rim surface of said inner annular portion of said rim that substantially faces in a radially inward direction, and an outer end fixedly coupled to one of said outer attachment openings to form an outer connection having a first outer retaining surface contacting a first outer rim surface of said outer annular portion of said rim that substantially faces in a radially outward direction and a second outer retaining surface contacting a second outer rim surface of said outer annular portion of said rim that substantially faces in a radially inward direction.

* * * * *